US012752575B2

(12) United States Patent
Ono

(10) Patent No.: US 12,752,575 B2
(45) Date of Patent: Oct. 6, 2026

(54) TIRE

(71) Applicant: SUMITOMO RUBBER INDUSTRIES, LTD., Hyogo (JP)

(72) Inventor: Shuichiro Ono, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 18/035,659

(22) PCT Filed: Nov. 1, 2021

(86) PCT No.: PCT/JP2021/040243

§ 371 (c)(1),
(2) Date: May 5, 2023

(87) PCT Pub. No.: WO2022/102453

PCT Pub. Date: May 19, 2022

(65) Prior Publication Data

US 2023/0406043 A1 Dec. 21, 2023

(30) Foreign Application Priority Data

Nov. 11, 2020 (JP) ................................ 2020-187833

(51) Int. Cl.
*B60C 11/00* (2006.01)
*B60C 1/00* (2006.01)
(Continued)

(52) U.S. Cl.
CPC .......... *B60C 11/033* (2013.01); *B60C 1/0016* (2013.01); *B60C 11/04* (2013.01); *B60C 2011/0016* (2013.01); *B60C 2011/133* (2013.01)

(58) Field of Classification Search
CPC ................. B60C 1/0016; B60C 11/033; B60C 2011/0016; B60C 2011/133
See application file for complete search history.

(56) References Cited

U.S. PATENT DOCUMENTS 5,031,680 A 7/1991 Kajikawa et al.
2008/0149237 A1 * 6/2008 Cambron ............ B60C 11/0323 152/154.2

(Continued)

FOREIGN PATENT DOCUMENTS

CN 115884883 A 10/2017
CN 107254075 A 3/2023

(Continued)

OTHER PUBLICATIONS

Machine translation for Japan 2011-089081 (Year: 2025).*

(Continued)

*Primary Examiner* — Steven D Maki
(74) *Attorney, Agent, or Firm* — Greenblum & Bernstein, P.L.C.

(57) ABSTRACT

A tire including a tread portion, the tread portion having at least one main groove continuously extending in the tire circumferential direction, the tread portion including a rubber having a hardness at 60° C. of 58 or higher and a hardness at 0° C. of not more than 115% of the hardness at 60° C., the tread portion having a $S_{50}/S_0$ ratio of more than 1, wherein $S_0$ denotes the sea proportion (%) in the tread ground contact surface of the new tire, and $S_{50}$ denotes the sea proportion (%) when the tread portion is worn until the depth of the main groove reaches 50% of that of the new tire.

17 Claims, 6 Drawing Sheets

(51) Int. Cl.

| | |
|---|---|
| ***B60C 11/03*** | (2006.01) |
| ***B60C 11/04*** | (2006.01) |
| ***B60C 11/13*** | (2006.01) |

(56) References Cited

U.S. PATENT DOCUMENTS

| | | | | |
|---|---|---|---|---|
| 2011/0178256 | A1* | 7/2011 | Hamann | C08L 15/00 526/79 |
| 2013/0165579 | A1 | 6/2013 | Mruk et al. | |
| 2013/0165587 | A1 | 6/2013 | Mruk et al. | |
| 2013/0165588 | A1 | 6/2013 | Mruk et al. | |
| 2016/0237253 | A1 | 8/2016 | Kakubo et al. | |
| 2018/0186979 | A1* | 7/2018 | Labrunie | B60C 1/0016 |
| 2018/0244104 | A1 | 8/2018 | Kuwayama et al. | |
| 2018/0291185 | A1* | 10/2018 | Horikawa | C08F 236/08 |
| 2018/0291188 | A1* | 10/2018 | Washizu | C08F 236/10 |
| 2019/0039421 | A1* | 2/2019 | Nakajima | B60C 11/042 |
| 2019/0100643 | A1* | 4/2019 | Hatano | B60C 1/00 |
| 2019/0160870 | A1 | 5/2019 | Ono | |
| 2019/0309146 | A1 | 10/2019 | Yokoyama et al. | |
| 2020/0207956 | A1* | 7/2020 | Kanbara | C08L 15/00 |
| 2022/0176744 | A1 | 6/2022 | Kunisawa | |
| 2022/0371372 | A1 | 11/2022 | Oshimo et al. | |
| 2023/0226856 | A1 | 7/2023 | Ono | |

FOREIGN PATENT DOCUMENTS

| | | | | |
|---|---|---|---|---|
| EP | 2607102 | A1 * | 6/2013 | B60C 1/0016 |
| EP | 3470458 | A1 * | 4/2019 | C08L 9/06 |
| JP | 02-053608 | A | 2/1990 | |
| JP | H03-119041 | A | 5/1991 | |
| JP | 05-338412 | A | 12/1993 | |
| JP | 2000-016026 | A | 1/2000 | |
| JP | 2002-211211 | A | 7/2002 | |
| JP | 2008-214377 | A | 9/2008 | |
| JP | 2011-089081 | A * | 5/2011 | |
| JP | 2013-139563 | A | 7/2013 | |
| JP | 6319469 | B1 | 4/2018 | |
| JP | 2019-026241 | A | 2/2019 | |
| JP | 2019-099656 | A | 6/2019 | |
| JP | 2020-015484 | A | 1/2020 | |
| JP | 6753487 | B1 | 8/2020 | |
| JP | 2020-139112 | A | 9/2020 | |
| WO | 2020/189100 | A1 | 9/2020 | |

OTHER PUBLICATIONS

ISR issued in International Patent Application No. PCT/JP2021/040243, Jan. 18, 2022, translation.

IPRP issued in International Patent Application No. PCT/JP2021/040243, May 16, 2023, translation.

* cited by examiner

TIRE

TECHNICAL FIELD

The present disclosure relates to a tire.

BACKGROUND ART

Tires with various desirable properties have been desired (see, for example, Patent Literature 1).

CITATION LIST

Patent Literature

Patent Literature 1: JP 2008-214377 A

SUMMARY OF DISCLOSURE

Technical Problem

However, the study of the present discloser revealed that conventional techniques have room for improvement in overall performance in terms of handling stability on wet roads when worn and handling stability on icy roads when worn.

The present disclosure aims to solve the problem and provide a tire having excellent overall performance in terms of handling stability on wet roads when worn and handling stability on icy roads when worn.

Solution to Problem

The present disclosure relates to a tire, including a tread portion,

- the tread portion having at least one main groove continuously extending in a tire circumferential direction,
- the tread portion including a rubber having a hardness at 60° C. of 58 or higher and a hardness at 0° C. of not more than 115% of the hardness at 60° C.,
- the tread portion having a $S_{50}/S_0$ ratio of more than 1, wherein $S_0$ denotes a sea proportion (%) in a tread ground contact surface of the new tire, and $S_{50}$ denotes a sea proportion (%) when the tread portion is worn until a depth of the main groove reaches 50% of that of the new tire.

Advantageous Effects of Disclosure

The tire according to the present disclosure includes a tread portion which has at least one main groove continuously extending in the tire circumferential direction, includes a rubber having a predetermined hardness or higher at 60° C. and a hardness at 0° C. of not more than a predetermined percentage of the hardness at 60° C., and has a $S_{50}/S_0$ ratio of more than 1, wherein $S_0$ denotes the sea proportion (%) in the tread ground contact surface of the new tire, and $S_{50}$ denotes the sea proportion (%) when the tread portion is worn until the depth of the main groove reaches 50% of that of the new tire. Such a tire has excellent overall performance in terms of handling stability on wet roads when worn and handling stability on icy roads when worn.

DESCRIPTION OF EMBODIMENTS

Figure 1:
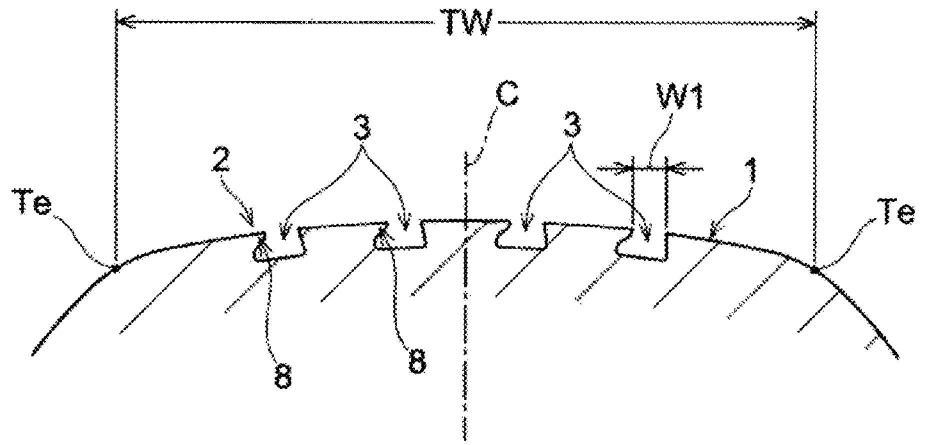
FIG. 1 shows a cross-sectional view of a tread portion of a tire according to one embodiment of the present disclosure.

The tire of the present disclosure includes a tread portion. The tread portion has at least one main groove continuously extending in the tire circumferential direction. The tread portion includes a rubber having a hardness at 60° C. of 58 or higher and a hardness at 0° C. of not more than 115% of the hardness at 60° C. The tread portion has a $S_{50}/S_0$ ratio of more than 1, wherein $S_0$ denotes the sea proportion (%) in the tread ground contact surface of the new tire, and $S_{50}$ denotes the sea proportion (%) when the tread portion is worn until the depth of the main groove reaches 50% of that of the new tire. Thus, the tire has excellent overall performance in terms of handling stability on wet roads when worn and handling stability on icy roads when worn.

Here, the hardness is the JIS-A hardness of the rubber at 0° C. or 60° C.

The tire provides the above-mentioned effect. The reason why the tire provides such an advantageous effect is not exactly clear but is believed to be as follows.

Reliable water drainage and rubber hardness are necessary to enhance handling stability on wet roads. When usual tires are worn, their grooves (sea proportion) are reduced, which is disadvantageous for water drainage. In contrast, the tread according to the present disclosure has a groove shape with a specific relationship between the sea proportion of the new tire and the sea proportion of the worn tire, i.e., a tire groove shape in which the grooves (sea proportion) are increased as the tire is worn, and the tread is formed of a rubber that is hard at 60° C. Thus, the tire when worn provides good handling stability on wet roads.

Meanwhile, to enhance handling stability on icy roads, the rigidity of the tread land portions and the hardness of the ground contact surface need to be reduced to allow the tire to conform to the road surface as much as possible between step-in and kick-out. When usual tires are worn, their grooves (sea proportion) are reduced, and therefore the rigidity of the land portions is increased. Moreover, for a usual rubber, the hardness of the ground contact surface is higher at 0° C. than at 60° C. In contrast, the tread according to the present disclosure has a tire groove shape in which the grooves (sea proportion) are increased as the tire is worn, and the tread is formed of a rubber whose hardness at 0° C. is reduced to be not more than a predetermined percentage of the hardness at 60° C., i.e., a rubber which at 0° C. is slightly soft or a little harder than when it is at 60° C. Thus, the tire when worn provides good handling stability on icy roads.

Accordingly, the present disclosure solves the problem (purpose) of improving overall performance in terms of handling stability on wet roads when worn and handling stability on icy roads when worn by formulating a tire that satisfies the hardness parameters and the sea proportion parameters. In other words, the parameters do not define the problem (purpose), and the problem herein is to improve overall performance in terms of handling stability on wet roads when worn and handling stability on icy roads when worn. In order to solve this problem, the tire has been formulated to satisfy the hardness parameters and the sea proportion parameters. Thus, it is an essential requirement to satisfy the hardness parameters and the sea proportion parameters.

Moreover, herein, the hardness of the rubber refers to the hardness of the vulcanized rubber.

The following describes the method of measuring the hardness.

Herein, the hardness (JIS-A hardness) of the (vulcanized) rubber can be measured at 0° C. or 60° C. in accordance with JIS K 6253-3 (2012) "Rubber, vulcanized or thermoplastic—Determination of hardness—Part 3: Durometer method" using a type A durometer.

The hardness at 60° C. of the rubber included in the tread portion is 58 or higher, preferably 59 or higher. The upper limit is not limited, but is preferably 75 or lower, more preferably 70 or lower, still more preferably 65 or lower, particularly preferably 62 or lower, most preferably 61 or lower, further most preferably 60 or lower. When the hardness at 60° C. is within the range indicated above, the advantageous effect tends to be more suitably achieved.

The hardness at 0° C. of the rubber included in the tread portion is not more than 115%, preferably not more than 110%, more preferably not more than 108%, still more preferably not more than 107% of the hardness at 60° C. The lower limit is not limited, but is preferably not less than 90%, more preferably not less than 95%, still more preferably not less than 100%, particularly preferably not less than 102%, most preferably not less than 103% of the hardness at 60° C. When the hardness at 0° C. is within the range indicated above, the advantageous effect tends to be more suitably achieved.

The tire includes a tread portion which has at least one main groove continuously extending in the tire circumferential direction and has a $S_{50}/S_0$ ratio of more than 1, wherein $S_0$ denotes the sea proportion (%) in the tread ground contact surface of the new tire, and $S_{50}$ denotes the sea proportion (%) when the tread portion is worn until the depth of the main groove reaches 50% of that of the new tire. The $S_{50}/S_0$ ratio is preferably 1.05 or more, more preferably 1.07 or more, still more preferably 1.10 or more, particularly preferably 1.15 or more, most preferably 1.18 or more, further most preferably 1.20 or more. The upper limit is not limited, but is preferably 1.40 or less, more preferably 1.37 or less, still more preferably 1.35 or less, particularly preferably 1.33 or less, most preferably 1.31 or less, further most preferably 1.29 or less. When the ratio is within the range indicated above, the aperture area of the main groove on the tread surface of the tread portion can be ensured even when the tread portion is worn. Thus, the advantageous effect tends to be more suitably achieved.

$S_{50}$(%), which denotes the sea proportion when the tread portion is worn until the depth of the main groove reaches 50% of that of the new tire, is preferably 5 or higher, more preferably 20 or higher, still more preferably 25 or higher, particularly preferably 30 or higher, most preferably 35 or higher, further most preferably 39 or higher, still further most preferably 41 or higher. The upper limit is not limited, but is preferably 100 or lower, more preferably 60 or lower, still more preferably 50 or lower, particularly preferably 45 or lower. When $S_{50}$ is within the range indicated above, the advantageous effect tends to be more suitably achieved.

As used herein, the term "sea proportion $S_0$" refers to the proportion (%) of the total groove area of all grooves which can remain after 50% wear of the main groove without changing the tread radius relative to the entire tread ground contact area that would be obtained if all grooves in the tread portion were not provided, determined when the tire is new. It should be noted that the total groove area thus does not include the area of the grooves which do not remain after 50% wear of the main groove without changing the tread radius. Moreover, the term "sea proportion $S_{50}$" refers to the proportion (%) of the total groove area of all grooves which have remained after 50% wear of the main groove without changing the tread radius relative to the entire tread ground contact area that would be obtained if all grooves in the tread portion were not provided, determined after the 50% wear. Moreover, herein, when the tread portion is provided with a plurality of main grooves with different depths, the term "main groove" refers to the deepest one among the main grooves.

Here, the term "entire tread ground contact area that would be obtained if all grooves in the tread portion were not provided" refers to the area defined by the outline of the contact patch of the tire determined by transferring an ink applied to the tread portion as described later.

The sea proportion $S_0$ and the sea proportion $S_{50}$ may be determined by any method and may be calculated as described below. A contact patch of the tire may be determined by mounting the tire on a normal rim, allowing the tire to retain an internal pressure of 230 kPa when it is a passenger vehicle tire, or a normal internal pressure (maximum internal pressure) when it is a light truck or van-type truck tire, applying an ink to the tread portion, and perpendicularly pressing the tread portion against a paper or the like at a load of 70% (for passenger vehicle tire) or 80% (for light truck or van-type truck tire) of a maximum load capacity to transfer the ink applied to the tread portion. The sea proportion $S_0$ may be calculated by regarding the area defined by the outline of the contact patch as the entire tread ground contact area that would be obtained if all grooves were not provided, and determining the total groove area of all grooves which can remain after 50% wear of the main groove without changing the tread radius, in the parts without the ink. Moreover, the sea proportion $S_{50}$ may be calculated similarly as above by determining the entire tread ground contact area that would be obtained if all grooves in the tread portion were not provided and the total groove area of all grooves which have remained after 50% wear of the main groove without changing the tread radius, determined after the 50% wear.

Herein, the sea proportions can be calculated from the entire tread ground contact area that would be obtained if all grooves were not provided and the total groove area, each determined as described above, using the equation:

$$\text{Total groove area}/(\text{Entire tread ground contact area}-\text{Total groove area})\times 100.$$

Next, production guidelines for satisfying the hardness parameters and the sea proportion parameters will be described. For example, the below-mentioned tire structure may be used to satisfy the sea proportion parameters. First, a production guideline for satisfying the hardness parameters is described.

The hardness parameters, i.e., the hardness at 60° C. of 58 or higher and the hardness at 0° C. of not more than 115% of the hardness at 60° C. indicate that the rubber is hard at 60° C. and has a hardness at 0° C. that is reduced to be not more than a predetermined percentage of the hardness at 60°

C., namely, the rubber at 0° C. is slightly soft or a little harder than when it is at 60° C.

A rubber with such properties may be produced by using a material that changes its hydrophilicity with changes in temperature, for example, a polymer containing a group that changes its hydrophilicity with changes in temperature, specifically a polymer composite in which a group that changes its hydrophilicity with changes in temperature is bound to a conjugated diene polymer, more specifically a polymer composite in which a group that shows a lower critical solution temperature (LCST) in water is bound to a conjugated diene polymer.

The fact that the polymer composite incorporated in a rubber shows hydrophobicity (or can easily attract plasticizers such as oils to its surroundings) at 60° C. and shows hydrophilicity (or can easily release plasticizers into the matrix rubber) at 0° C. may be used to realize a rubber composition which at 60° C. has a normal hardness and which at 0° C. is softer or only slightly harder than when it is at 60° C.

Figure 8:
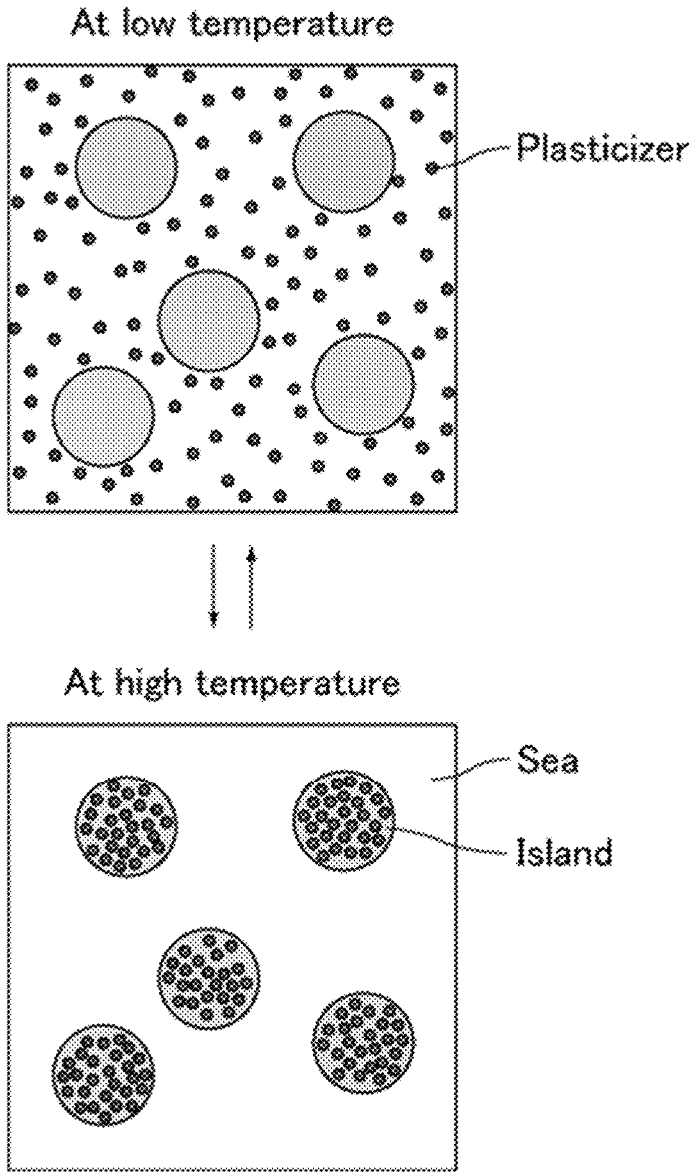
FIG. 8 shows a schematic diagram illustrating the behavior of a plasticizer in a rubber.

For example, when the polymer composite incorporated in a rubber forms islands in a sea-island structure, the group having a LCST in the polymer composite shows hydrophobicity at high temperatures, for example, at 60° C. and can easily attract plasticizers to its surroundings, so that the concentration of plasticizers in the matrix rubber is reduced and the hardness of the rubber is increased, as shown in FIG. 8. On the other hand, the group having a LCST in the polymer composite shows hydrophilicity at low temperatures, for example, at 0° C. and can easily release plasticizers into the matrix rubber, so that the concentration of plasticizers in the matrix rubber is increased and the hardness of the rubber is reduced. Thus, the plasticizers will move in the rubber with changes in environmental temperature by the action of the polymer containing a group that changes its hydrophilicity with changes in temperature. Accordingly, a rubber satisfying the hardness parameters can be produced.

Here, the hardness (absolute value) of the rubber may be controlled by the types or amounts of chemicals (in particular, rubber components, fillers, plasticizers, silane coupling agents) incorporated in the rubber composition. For example, the hardness tends to be increased by increasing the amount of fillers or reducing the amount of plasticizers, while the hardness tends to be reduced by reducing the amount of fillers or increasing the amount of plasticizers.

A rubber satisfying the hardness parameters may be produced by other techniques, such as using a material having a small temperature dependence of hardness in place of a temperature-responsive material such as a polymer containing a group that changes its hydrophilicity with changes in temperature as described above.

Examples of the material having a small temperature dependence of hardness include materials which are hard both at room temperature and at low temperatures, such as inorganic compounds, and materials which are soft both at room temperature and at low temperatures, such as oils.

Incorporating a sufficiently large amount of such a material to rubber components may inhibit the effect of the temperature dependence of the hardness of the rubber components, thereby reducing the difference between the hardness at 0° C. and hardness at 60° C. of the rubber. For example, the difference between the hardness at 0° C. and hardness at 60° C. of the rubber may be reduced by incorporating at least 300 parts by mass of an inorganic compound such as calcium carbonate or clay per 100 parts by mass of rubber components.

The rubber composition included in the tread portion and chemicals that may be used in the rubber composition are described below.

(Material that Changes its Hydrophilicity with Changes in Temperature)

First, a material that changes its hydrophilicity with changes in temperature is described. The material may be any material that changes its hydrophilicity with changes in temperature, including, for example, a polymer containing a group that changes its hydrophilicity with changes in temperature. Specific examples of the polymer include a polymer composite containing a group that changes its hydrophilicity with changes in temperature.

The polymer composite containing a group that changes its hydrophilicity with changes in temperature is described below.

<Group that Changes its Hydrophilicity with Changes in Temperature>

First, the group that changes its hydrophilicity with changes in temperature is described below.

Herein, the group that changes its hydrophilicity with changes in temperature may be any group that changes its hydrophilicity with changes in temperature and is preferably a group that reversibly changes its hydrophilicity with changes in temperature.

The group that reversibly changes its hydrophilicity with changes in temperature may be a temperature-responsive polymer (temperature-responsive polymer group). In other words, the polymer composite containing a group that reversibly changes its hydrophilicity with changes in temperature may mean a polymer composite containing a group formed of a temperature-responsive polymer, for example. Examples of such polymer composites include polymer composites grafted with temperature-responsive polymers, polymer composites containing temperature-responsive polymer units in the backbone, and polymer composites containing temperature-responsive polymer blocks in the backbone. These may be used alone or in combinations of two or more.

The term "temperature-responsive polymer" refers to a material which in water undergoes reversible changes in the conformation of the polymer chains associated with hydration and dehydration in response to changes in temperature, and thus reversibly changes its hydrophilicity and hydrophobicity with changes in temperature. Such reversible changes are known to be caused by a molecular structure containing in a molecule a hydrophilic group capable of forming a hydrogen bond and a hydrophobic group hardly compatible with water.

Then, the present discloser has found that a temperature-responsive polymer, not only when in water but also when in a rubber composition, exhibits reversible changes in hydrophilicity and hydrophobicity with changes in temperature. Furthermore, it has been found that a polymer composite in which the conjugated diene polymer is bound to a group that changes its hydrophilicity with changes in temperature (temperature-responsive polymer group), when in a rubber composition, also exhibits reversible changes in hydrophilicity and hydrophobicity with changes in temperature.

Known temperature-responsive polymers include polymers that show a lower critical solution temperature (LCST, also known as lower critical consolute temperature or lower critical dissolution temperature) in water and polymers that show an upper critical solution temperature (UCST, also known as upper critical consolute temperature or upper critical dissolution temperature) in water. These may be used alone or in combinations of two or more.

The polymers that show a LCST become hydrophobic at temperatures higher than the LCST boundary as the intramolecular or intermolecular hydrophobic interaction becomes stronger to cause aggregation of the polymer chains. On the other hand, at temperatures lower than the LCST, they become hydrophilic as the polymer chains are hydrated by binding with water molecules. Thus, the polymers show a reversible phase transition behavior around the LCST.

In contrast, the polymers that show a UCST become hydrophobic and insoluble at temperatures lower than the UCST, while they become hydrophilic and soluble at temperatures higher than the UCST. Thus, the polymers show a reversible phase transition behavior around the UCST. The reason for such a UCST-type behavior is thought to be that intermolecular force can be driven by the hydrogen bonds between the side chains having a plurality of amide groups.

In the polymer composite, the group that reversibly changes its hydrophilicity with changes in temperature is preferably a polymer that shows a LCST. In other words, the group that changes its hydrophilicity with changes in temperature is preferably a group that shows a lower critical solution temperature in water.

Herein, the group that shows a lower critical solution temperature (LCST) in water refers to a group which is present in a polymer composite and which shows a lower critical solution temperature in water when the group is cleaved from the polymer composite and the cleaved group (polymer) is introduced into water.

Likewise, the group that shows an upper critical solution temperature (UCST) in water herein refers to a group which is present in a polymer composite and which shows an upper critical solution temperature in water when the group is cleaved from the polymer composite and the cleaved group (polymer) is introduced into water.

The group (polymer) that shows a LCST is described below.

The group (polymer) that shows a LCST may include a single group (polymer) or a combination of two or more groups (polymers).

The group (polymer) that shows a LCST may be any group (polymer) that shows a LCST. Preferred are poly(N-substituted (meth)acrylamides). Preferred among the poly (N-substituted (meth)acrylamides) are groups represented by the following formula (I):

(I)

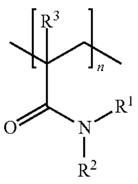

wherein n represents an integer of 1 to 1000; and $R^1$, $R^2$, and $R^3$ each independently represent a hydrogen atom or a hydrocarbyl group, provided that at least one of $R^1$ or $R^2$ is not a hydrogen atom, and $R^1$ and $R^2$ together may form a ring structure.

Preferably, n is 3 or larger, more preferably 5 or larger, still more preferably 10 or larger, particularly preferably 20 or larger, but is preferably 500 or smaller, more preferably 300 or smaller, still more preferably 150 or smaller, particularly preferably 80 or smaller, most preferably 40 or smaller, further most preferably 30 or smaller. When n is within the range indicated above, the advantageous effect tends to be better achieved.

The hydrocarbyl group for $R^1$ and $R^2$ may have any number of carbon atoms. The number of carbon atoms is preferably 1 or larger, more preferably 2 or larger, still more preferably 3 or larger, but is preferably 20 or smaller, more preferably 18 or smaller, still more preferably 14 or smaller, particularly preferably 10 or smaller, most preferably 6 or smaller, further most preferably 4 or smaller. When the number of carbon atoms is within the range indicated above, the advantageous effect tends to be better achieved.

Examples of the hydrocarbyl group for $R^1$ and $R^2$ include alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and aryl groups such as methylphenyl and ethylphenyl groups. Alkyl and cycloalkyl groups are preferred among these, with alkyl groups being more preferred.

The number of carbon atoms in the ring structure formed by $R^1$ and $R^2$ is preferably 3 or larger, more preferably 4 or larger, but is preferably 7 or smaller, more preferably 5 or smaller. When the number of carbon atoms is within the range indicated above, the advantageous effect tends to be better achieved.

The hydrocarbyl group for $R^1$ and $R^2$ may be branched or unbranched, preferably branched.

Preferably, $R^1$ and $R^2$ are each a hydrogen atom, an alkyl group (in particular, a branched alkyl group), or a cycloalkyl group, or $R^1$ and $R^2$ together form a ring structure. More preferably, $R^1$ and $R^2$ are any of the combinations shown in Table 1, still more preferably a combination of a hydrogen atom and an alkyl group (in particular, a branched alkyl group), particularly preferably a combination of a hydrogen atom and a propyl group (in particular, an isopropyl group).

TABLE 1

Chemical structure of preferred poly (N-substituted acrylamides), LCST

| $—NR^1R^2$ | Activation temperature [LCST] (° C.) |
| --- | --- |
| $NH—CH_2—CH_3$ | 82 |
| $NH—CH_2—CH_2—CH_3$ | 22 |
| $NH—CH—(CH_3)_2$ | 32-34 |
| $N(CH_3)(CH_2—CH_3)$ | 56 |
| $N(CH_2—CH_3)_2$ | 32-42 |
| $N(CH_2—(CH_3)_2)(CH_3)$ | 25 |
| 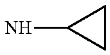 | 47 |
| 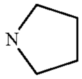 | 55 |
| 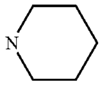 | 4 |

The hydrocarbyl group for $R^3$ may have any number of carbon atoms. The number of carbon atoms is preferably 1 or larger, but is preferably 5 or smaller, more preferably 3 or smaller, still more preferably 2 or smaller, particularly preferably 1. When the number of carbon atoms is within the range indicated above, the advantageous effect tends to be better achieved.

Examples of the hydrocarbyl group for $R^3$ include those listed for the hydrocarbyl group for $R^1$ and $R^2$. Alkyl groups are preferred among these.

The hydrocarbyl group for $R^3$ may be branched or unbranched.

$R^3$ is preferably a hydrogen atom or an alkyl group, more preferably a hydrogen atom.

Examples of the groups of formula (I) include: poly(N-alkylacrylamide) polymers such as poly(N-isopropylacrylamide), poly(N-ethylacrylamide), poly(N-n-propylacrylamide), poly(N-ethyl,N-methylacrylamide), poly(N,N-diethylacrylamide), poly(N-isopropyl,N-methylacrylamide), poly(N-cyclopropylacrylamide), poly (N-acryloylpyrrolidine), and poly(N-acryloylpiperidine); and poly(N-alkylmethacrylamide) polymers such as poly(N-isopropylmethacrylamide), poly(N-ethylmethacrylamide), poly(N-n-propylmethacrylamide), poly(N-ethyl,N-methylmethacrylamide), poly(N,N-diethylmethacrylamide), poly (N-isopropyl,N-methylmethacrylamide), poly(N-cyclopropylmethacrylamide), poly(N-methacryloylpyrrolidine), and poly(N-methacryloylpiperidine). These may be used alone or in combinations of two or more. Poly(N-isopropylacrylamide), poly(N,N-diethylacrylamide), poly(N-n-propylacrylamide), and poly(N-isopropyl,N-methylacrylamide) are preferred among these, with poly(N-isopropylacrylamide) (PNIPAM) being more preferred.

PNIPAM is a thermosensitive material that exhibits large changes in surface energy in response to small changes in temperature. For example, see N. Mori, et al., Temperature Induced Changes in the Surface Wettability of SBR+PNIPA Films, 292, Macromol. Mater. Eng. 917, 917-22 (2007).

PNIPAM has in the side chains a hydrophobic isopropyl group at the base of which is a hydrophilic amide bond.

PNIPAM becomes soluble in water at temperatures lower than 32° C., where the hydrophilic amide bond moiety forms a hydrogen bond with a water molecule. On the other hand, at temperatures not lower than 32° C., the hydrogen bond is cleaved due to the vigorous thermal motion of the molecules, and the intramolecular or intermolecular hydrophobic interaction due to the hydrophobic isopropyl group moieties in the side chains becomes stronger to cause aggregation of the polymer chains, so that PNIPAM becomes insoluble in water.

As described above, PNIPAM has a LCST, which is a switching temperature at which it switches from a hydrophilic state to a hydrophobic state, of about 32° C.

The contact angle of a water droplet placed on a PNIPAM polymer film drastically changes above and below the LCST temperature. For example, the contact angle of a water droplet placed on a PINPAM film is about 60° (hydrophilic) at below 32° C. and then, when it is heated to a temperature higher than 32° C., exceeds about 93° (hydrophobic).

A polymer composite containing a PNIPAM group, which greatly changes its surface properties from hydrophilic to hydrophobic at about 32° C., may be used as a polymer composite for a rubber composition to reversibly vary tire performance in response to changes in temperature.

Although the group (polymer) that shows a LCST may suitably be a group as described above, it is more preferably a poly(alkyl vinyl ether), still more preferably a group represented by the formula (A) below. In this case, the advantageous effect tends to be more suitably achieved. These groups may be used alone or in combinations of two or more.

(A)

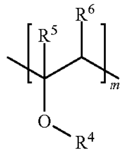

In the formula, m represents an integer of 1 to 1000, and $R^4$, $R^5$, and $R^6$ each independently represent a hydrogen atom or a hydrocarbyl group.

Preferably, m is 3 or larger, more preferably 5 or larger, still more preferably 10 or larger, particularly preferably 20 or larger, but is preferably 500 or smaller, more preferably 300 or smaller, still more preferably 150 or smaller, particularly preferably 80 or smaller, most preferably 40 or smaller, further most preferably 30 or smaller. When m is within the range indicated above, the advantageous effect tends to be better achieved.

The hydrocarbyl group for $R^4$ may have any number of carbon atoms. The number of carbon atoms is preferably 1 or larger, more preferably 2 or larger, but is preferably 20 or smaller, more preferably 18 or smaller, still more preferably 14 or smaller, particularly preferably 10 or smaller, most preferably 6 or smaller, further most preferably 4 or smaller. When the number of carbon atoms is within the range indicated above, the advantageous effect tends to be better achieved.

The hydrocarbyl group for $R^5$ and $R^6$ may have any number of carbon atoms. The number of carbon atoms is preferably 1 or larger, but is preferably 5 or smaller, more preferably 3 or smaller, still more preferably 2 or smaller, particularly preferably 1. When the number of carbon atoms is within the range indicated above, the advantageous effect tends to be better achieved.

Examples of the hydrocarbyl group for $R^4$, $R^5$, and $R^6$ include alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and aryl groups such as methylphenyl and ethylphenyl groups. Alkyl and cycloalkyl groups are preferred among these, with alkyl groups being more preferred.

Preferably, $R^4$ is an alkyl group and $R^5$ and $R^6$ are hydrogen atoms. More preferably, $R^4$ is an ethyl group and $R^5$ and $R^6$ are hydrogen atoms.

Examples of the groups of formula (A) include poly (methyl vinyl ether), poly(ethyl vinyl ether), poly(propyl vinyl ether), poly(butyl vinyl ether), poly(pentenyl ether), poly(hexyl vinyl ether), poly(heptyl vinyl ether), poly(octyl ether), and poly(ethoxyethyl vinyl ether). These may be used alone or in combinations of two or more. Poly(ethyl vinyl ether) (PEVE) is preferred among these. An extensive study of the present discloser revealed that PEVE shows a LCST of −20 to +5° C.

Examples of groups (polymers) that show a LCST other than the groups of formula (I) and the groups of formula (A) include poly(N-vinyl-caprolactam) represented by the formula (II) below (LSCT: about 31° C.), poly(2-alkyl-2-oxazolines) represented by the formula (III) below (LSCT: about 62° C. when R is an ethyl group, about 36° C. when R is an isopropyl group, and about 25° C. when R is a n-propyl group), alkyl-substituted celluloses (e.g., methyl cellulose represented by the formula (IV) below (LSCT: about 50° C.), hydroxypropyl cellulose, hydroxyethyl methyl cellulose, and hydroxypropyl methyl cellulose), poly (N-ethoxyethylacrylamide) (LSCT: about 35° C.), poly(N-ethoxyethylmethacrylamide) (LSCT: about 45° C.), poly(N-tetrahydrofurfurylacrylamide) (LSCT: about 28° C.), poly (N-tetrahydrofurfurylmethacrylamide) (LSCT: about 35° C.), polyvinyl methyl ether, poly[2-(dimethylamino)ethyl methacrylate], poly(3-ethyl-N-vinyl-2-pyrrolidone), hydroxybutyl chitosan, polyoxyethylene (20) sorbitan monostearate, polyoxyethylene (20) sorbitan monolaurate, polyoxyethylene (20) sorbitan monooleate, poly(ethylene glycol)methacrylates containing 2 to 6 ethylene glycol units, polyethylene glycol-co-polypropylene glycols (preferably those containing 2 to 8 ethylene glycol units and 2 to 8 polypropylene units, more preferably compounds represented by formula (A)), ethoxylated iso-$C_{13}H_{27}$-alcohols (preferably having an ethoxylation degree of 4 to 8), polyethylene glycols containing 4 to 50, preferably 4 to 20 ethylene glycol units, polypropylene glycols containing 4 to 30, preferably 4 to 15 propylene glycol units, monomethyl, dimethyl, monoethyl, or diethyl ethers of polyethylene glycols containing 4 to 50, preferably 4 to 20 ethylene glycol units, and monomethyl, dimethyl, monoethyl, or diethyl ethers of polypropylene glycols containing 4 to 50, preferably 4 to 20 propylene glycol units. These may be used alone or in combinations of two or more.

$$HO—[—CH_2—CH_2—O]_x—[—CH(CH_3)—CH_2—O]_y—[—CH_2—CH_2—O]_z—H \quad (A)$$

In the formula, y is 3 to 10, and each of x and z is 1 to 8, provided that y+x+z is 5 to 18.

(II)

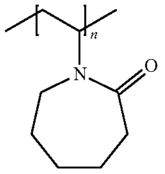

(III)

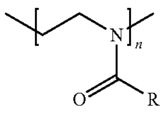

(IV)

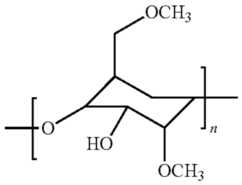

In formulas (II) to (IV), n is as defined for n in formula (I). In formula (III), R is an alkyl group selected from a n-propyl group, an isopropyl group, or an ethyl group.

Although the group (polymer) that shows a LCST may suitably be a group as described above, it is also preferably a group represented by the formula (B) below. In this case, the advantageous effect tends to be more suitably achieved. These groups may be used alone or in combinations of two or more.

(B)

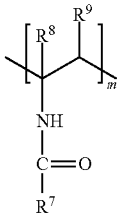

In the formula, m represents an integer of 1 to 1000, and $R^7$, $R^8$, and $R^9$ each independently represent a hydrogen atom or a hydrocarbyl group.

Preferably, m is 3 or larger, more preferably 5 or larger, still more preferably 10 or larger, particularly preferably 20 or larger, but is preferably 500 or smaller, more preferably 300 or smaller, still more preferably 150 or smaller, particularly preferably 80 or smaller, most preferably 40 or smaller, further most preferably 30 or smaller. When m is within the range indicated above, the advantageous effect tends to be better achieved.

The hydrocarbyl group for $R^7$ may have any number of carbon atoms. The number of carbon atoms is preferably 1 or larger, more preferably 2 or larger, but is preferably 20 or smaller, more preferably 18 or smaller, still more preferably 14 or smaller, particularly preferably 10 or smaller, most preferably 6 or smaller, further most preferably 4 or smaller. When the number of carbon atoms is within the range indicated above, the advantageous effect tends to be better achieved.

The hydrocarbyl group for $R^8$ and $R^9$ may have any number of carbon atoms. The number of carbon atoms is preferably 1 or larger, but is preferably 5 or smaller, more preferably 3 or smaller, still more preferably 2 or smaller, particularly preferably 1. When the number of carbon atoms is within the range indicated above, the advantageous effect tends to be better achieved.

Examples of the hydrocarbyl group for $R^7$, $R^8$, and $R^9$ include alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and aryl groups such as methylphenyl and ethylphenyl groups. Alkyl and cycloalkyl groups are preferred among these, with alkyl groups being more preferred.

Preferably, $R^7$ is an alkyl group and $R^8$ and $R^9$ are hydrogen atoms. More preferably, $R^7$ is a n-propyl group or an isopropyl group and $R^8$ and $R^9$ are hydrogen atoms.

Examples of the groups of formula (B) include poly (isopropylvinylacrylamide) (PNIPVM, $R^7$ is an isopropyl group and $R^8$ and $R^9$ are hydrogen atoms), poly(n-propylvinylacrylamide) (PNNPAM, $R^7$ is a n-propyl group and $R^8$ and $R^9$ are hydrogen atoms), poly(n-butylvinylacrylamide) ($R^7$ is a n-butyl group and $R^8$ and $R^9$ are hydrogen atoms), poly(tert-butylvinylacrylamide) ($R^7$ is a tert-butyl group and $R^8$ and $R^9$ are hydrogen atoms), poly(sec-butylvinylacrylamide) ($R^7$ is a sec-butyl group and $R^8$ and $R^9$ are hydrogen atoms), poly(methylvinylacrylamide) ($R^7$ is a methyl group and $R^8$ and $R^9$ are hydrogen atoms), poly(ethylvinylacrylamide) ($R^7$ is an ethyl group and $R^8$ and $R^9$ are hydrogen atoms), poly(n-pentylvinylacrylamide) ($R^7$ is a n-pentyl group and $R^8$ and $R^9$ are hydrogen atoms), and poly(isopentylvinylacrylamide) ($R^7$ is an isopentyl group and $R^8$ and $R^9$ are hydrogen atoms). These may be used alone or in combinations of two or more. PNIPVM, PNNPAM, poly(n-butylvinylacrylamide), and poly(tert-butylvinylacrylamide)

are preferred among these, with PNIPVM or PNNPAM being more preferred. An extensive study of the present discloser revealed that PNIPVM shows a LCST of 39° C., and PNNPAM shows a LCST of 32° C.

Examples of groups that show a LCST (materials or polymers that change their hydrophilicity with changes in temperature) other than the above-mentioned groups include copolymers of N-isopropylacrylamide and butyl acrylate, block copolymers of N-isopropylacrylamide and polyethylene oxide, copolymers of N-isopropylacrylamide and fluoromonomers, polymer composites of poly-N-acetylacrylamide and polyethylene oxide, polymer composites of poly-N-acetylacrylamide and polyacrylamide, polymer composites of copolymers of N-acetylacrylamide and acrylamide and polyacrylamide, copolymers of N-acryloylglycinamide and N-acetylacrylamide, copolymers of 2-methoxyethyl acrylate and N,N-dimethylacrylamide, copolymers of a compound represented by the formula 1 below and N,N-dimethylacrylamide, poly(N,N-dimethyl(acrylamidopropyl) ammonium propanesulfate), copolymers of N,N-diethylacrylamide and maleic anhydride, copolymers of N,N-diethylacrylamide and dimethyl fumarate, copolymers of N,N-diethylacrylamide and hydroxyethyl methacrylate, copolymers of N,N-diethylacrylamide and butadiene, polymer composites of polyvinyl alcohol or polyvinyl alcohol hydrolysates and polyacrylamide, N-acryloylasparginamide polymers, N-acryloylglutaminamide polymers, N-methacryloylasparginamide polymers, copolymers of N-acryloylglycinamide and biotin methacrylamide derivatives, copolymers of N-acryloylglycinamide and N-acryloylasparginamide, biotin-immobilized temperature-responsive magnetic fine particles (fine particles produced by reacting N-acryloylglycinamide, methacrylated magnetic fine particles, and biotin monomers), poly(sulfobetainemethacrylamide), copolymers of N-vinyl-n-butylamide and maleic anhydride, copolymers of N-vinyl-n-butylamide and dimethyl fumarate, copolymers of N-vinyl-n-butylamide and hydroxyethyl methacrylate, copolymers of N-vinyl-n-butylamide and butadiene, polyesteramides, polyetheramides, copolymers of ethylene oxide and propylene oxide, monoaminated products of copolymers of ethylene oxide and propylene oxide, polyethylene oxide-polypropylene oxide-polyethylene oxide block copolymers, polymer composites of polyethylene oxide and polyvinyl alcohol, maltopentaose-modified polypropylene oxides, poly(lactide-co-glycolide)-polyethylene oxide-polylactide triblock copolymers, copolymers of 2-methoxyethyl acrylate and acryloylmorpholine, copolymers of 2-methoxyethyl acrylate and N-vinylpyrrolidone, copolymers of 2-methoxyethyl acrylate and 2-hydroxyethyl acrylate, copolymers of 2-methoxyethyl acrylate and methoxytriethylene glycol acrylate, poly[2-(2-ethoxyethoxy)ethyl acrylate], poly(2-(2-ethoxyethoxy)ethyl acrylate-co-2-(methoxyethoxy)ethyl methacrylate), poly(2-(N,N-dimethylaminoethyl)methacrylate), copolymers of N-vinylcaprolactam and hydroxyethyl methacrylate, copolymers of methyl vinyl ether and hydroxyethyl methacrylate, N-vinylcaprolactam polymers, copolymers of N-vinylcaprolactam and maleic anhydride, copolymers of N-vinylcaprolactam and dimethyl fumarate, copolymers of N-vinylcaprolactam and butadiene, copolymers of N-vinylcaprolactam, vinylpyrrolidine, and glycidyl methacrylate, copolymers of N-vinylcaprolactam, vinylpyrrolidine, and methacrylic acid, copolymers of N-vinylcaprolactam, vinylpyrrolidone, and α,α-dimethyl-meta-isopropenylbenzyl isocyanate, copolymers of N-vinylcaprolactam, vinylpyrrolidone, and hydroxyethyl methacrylate, poly(1-ethyl-3-vinyl-2-imidazolidone), poly(1-methyl-3-vinyl-2-imidazolidone), poly(1-n-propyl-3-vinyl-2-imidazolidone), poly(1-isopropyl-3-vinyl-2-imidazolidone), poly(1-acetyl-3-vinyl-2-imidazolidone), poly(1-propionyl-3-vinyl-2-imidazolidone), copolymers represented by the formula 2 below, poly(N-vinyl-2-imidazolidone compounds), copolymers of 2-hydroxyethyl vinyl ether and vinyl acetate, copolymers of diethylene glycol monovinyl ether and vinyl acetate, copolymers of methyl vinyl ether and maleic anhydride, copolymers of methyl vinyl ether and dimethyl fumarate, carbamoylated polyamino acids, polymers of a compound represented by the formula 3 below, polymers of a compound represented by the formula 4 below, poly(orthoesters) having a pendant[N-(2-hydroxyethyl)-L-glutamine] group, polyacetal-poly[N-(2-hydroxyethyl)-L-glutamine]-polyacetal triblock copolymers, poly[N-(2-hydroxyethyl)-L-glutamine]-poly(orthoester)-poly[N-(2-hydroxyethyl)-L-glutamine] triblock copolymers, poly[N-(2-hydroxyethyl)-L-glutamine]-polyacetal diblock copolymers, amino-terminated poly[N-(2-hydroxyethyl)-L-glutamines], amino-terminated poly(orthoesters), amino-terminated polyacetals, cellulose triacetate, magnetic nanoparticles, amino group-containing polystyrenes, and glycoluril polymers. These may be used alone or in combinations of two or more.

formula 1

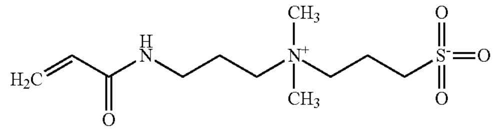

formula 2

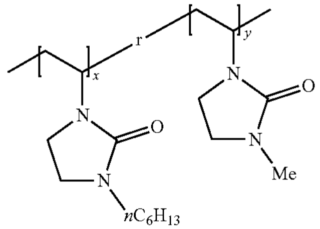

formula 3

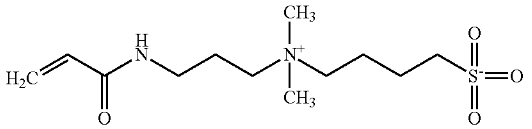

formula 4

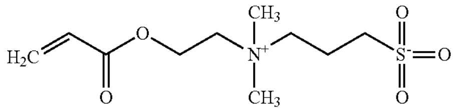

The weight average molecular weight of the group that changes its hydrophilicity with changes in temperature (the group formed of a temperature-responsive polymer) is preferably 330 or more, more preferably 560 or more, still more preferably 1130 or more, but is preferably 57000 or less, more preferably 34000 or less, still more preferably 17000 or less. When the weight average molecular weight is within the range indicated above, the advantageous effect tends to be better achieved.

The phase transition temperature (lower critical solution temperature (LCST) or upper critical solution temperature (UCST)) of the temperature-responsive polymer is preferably −50° C. or higher, more preferably −40° C. or higher, still more preferably −30° C. or higher, particularly preferably −25° C. or higher, but is preferably 60° C. or lower, more preferably 50° C. or lower, still more preferably 40° C. or lower, particularly preferably 35° C. or lower, most preferably 30° C. or lower, still most preferably 25° C. or lower, further most preferably 20° C. or lower. When the phase transition temperature is within the range indicated above, the advantageous effect tends to be better achieved.

Herein, the phase transition temperature of the temperature-responsive polymer is measured using a temperature-controllable spectrophotometer. A temperature-responsive polymer aqueous solution adjusted at 10% by mass may be put into a cell, which may then be covered with a parafilm for preventing vaporization and an in-cell temperature sensor may be attached thereto. Experiments may be conducted at a measurement wavelength of 600 nm, an acquisition temperature of 0.1° C., and a rate of temperature rise of 0.1° C. The temperature at which the transmittance reaches 90% is defined as the phase transition temperature.

Here, the temperature-responsive polymer refers to a temperature-responsive polymer group (temperature-responsive polymer) cleaved from a polymer composite containing the temperature-responsive polymer group.

<Method of Producing Polymer Composite>

The polymer composite may be formed, for example, by stirring a conjugated diene polymer having a weight average molecular weight of 100,000 or more as determined by gel permeation chromatography, a radical generator, and a reactant having at least one heteroatom and at least one carbon-carbon double bond in at least one solvent selected from the group consisting of hydrocarbon solvents, aromatic solvents, and aprotic polar solvents at a temperature of at least 40° C. but not higher than 200° C.

Here, the polymer composite may be produced by known synthesis techniques. For example, the polymer composite may be produced with reference to JP 2005-314419 A, JP 2016-505679 T, JP 2015-531672 T, JP 2003-252936 A, JP 2004-307523 A, etc.

<<Conjugated Diene Polymer>>

The weight average molecular weight (Mw) of the conjugated diene polymer as determined by gel permeation chromatography is 100,000 or more, preferably 200,000 or more, more preferably 300,000 or more, still more preferably 400,000 or more, particularly preferably 500,000 or more, most preferably 600,000 or more. The upper limit is not limited, but is preferably 4,000,000 or less, more preferably 3,000,000 or less, still more preferably 2,000,000 or less, particularly preferably 1,200,000 or less. When the Mw is within the range indicated above, the advantageous effect tends to be better achieved.

Herein, the Mw and number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

Non-limiting examples of the conjugated diene polymer include diene rubbers commonly used as rubber components in tire compositions, such as isoprene-based rubbers, polybutadiene rubbers (BR), styrene-butadiene rubbers (SBR), styrene-isoprene-butadiene rubbers (SIBR), ethylene-propylene-diene rubbers (EPDM), chloroprene rubbers (CR), acrylonitrile butadiene rubbers (NBR), and butyl rubbers (IIR). These may be used alone or in combinations of two or more. Isoprene-based rubbers, BR, and SBR are preferred among these, with BR or SBR being more preferred, with SBR being still more preferred.

The conjugated diene polymer may be a commercial product or may be polymerized according to known or other methods.

The diene rubbers may be either unmodified or modified polymers.

The modified polymers may be any polymer (preferably diene rubber) having a functional group interactive with a filler such as silica. Examples include a chain end-modified polymer obtained by modifying at least one chain end of a polymer by a compound (modifier) having the functional group (i.e., a chain end-modified polymer terminated with the functional group); a backbone-modified polymer having the functional group in the backbone; a backbone- and chain end-modified polymer having the functional group in both the backbone and chain end (e.g., a backbone- and chain end-modified polymer in which the backbone has the functional group and at least one chain end is modified by the modifier); and a chain end-modified polymer into which a hydroxy or epoxy group has been introduced by modification (coupling) with a polyfunctional compound having two or more epoxy groups in the molecule. These may be used alone or in combinations of two or more.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. Here, these functional groups may be substituted. These may be used alone or in combinations of two or more. Preferred among these are amino groups (preferably amino groups whose hydrogen atom is replaced with a C1-C6 alkyl group), alkoxy groups (preferably C1-C6 alkoxy groups), and alkoxysilyl groups (preferably C1-C6 alkoxysilyl groups).

Any SBR may be used. Examples include emulsion-polymerized styrene-butadiene rubbers (E-SBR) and solution-polymerized styrene-butadiene rubbers (S-SBR). These may be used alone or in combinations of two or more.

The styrene content of the SBR is preferably 5% by mass or higher, more preferably 10% by mass or higher, still more preferably 15% by mass or higher, particularly preferably 20% by mass or higher. The styrene content is also preferably 60% by mass or lower, more preferably 50% by mass or lower, still more preferably 40% by mass or lower, particularly preferably 30% by mass or lower. When the styrene content is within the range indicated above, the advantageous effect tends to be better achieved.

Herein, the styrene content of the SBR can be determined by $^{1}$H-NMR analysis.

SBR products manufactured or sold by Sumitomo Chemical Co., Ltd., JSR Corporation, Asahi Kasei Corporation, Zeon Corporation, etc. may be used as the SBR.

The SBR may be either unmodified or modified SBR. Examples of the modified SBR include those into which functional groups as listed for the modified polymers have been introduced. Unmodified SBR is preferred among these.

Any BR may be used. Examples include high-cis BR having a high cis content, BR containing syndiotactic polybutadiene crystals, and BR synthesized using rare earth catalysts (rare earth-catalyzed BR). These may be used alone or in combinations of two or more. Rare earth-catalyzed BR is preferred among these.

The cis content of the BR is preferably 90% by mass or higher, more preferably 95% by mass or higher. The upper limit is not limited. When the cis content is within the range indicated above, the advantageous effect tends to be better achieved.

Here, the cis content can be measured by infrared absorption spectrometry.

Moreover, the BR may be either unmodified or modified BR. Examples of the modified BR include those into which functional groups as listed for the modified polymers have been introduced. Unmodified BR is preferred among these.

Examples of commercial BR include those available from Ube Industries, Ltd., JSR Corporation, Asahi Kasei Corporation, Zeon Corporation, etc.

Examples of isoprene-based rubbers include natural rubbers (NR), polyisoprene rubbers (IR), refined NR, modified NR, and modified IR. Examples of NR include those commonly used in the tire industry such as SIR20, RSS #03, and TSR20. Any IR may be used, including for example those commonly used in the tire industry such as IR2200. Examples of refined NR include deproteinized natural rubbers (DPNR) and highly purified natural rubbers (UPNR). Examples of modified NR include epoxidized natural rubbers (ENR), hydrogenated natural rubbers (HNR), and grafted natural rubbers. Examples of modified IR include epoxidized polyisoprene rubbers, hydrogenated polyisoprene rubbers, and grafted polyisoprene rubbers. These may be used alone or in combinations of two or more. NR is preferred among these.

<<Radical Generator>>

Any radical generator may be used, including for example those commonly used as radical initiators such as azo compounds, organic oxides, dihalogens, and redox initiators. These may be used alone or in combinations of two or more.

The azo compounds may be any compound containing an azo bond. Examples include azobisisobutyronitrile (AIBN), azodicarbonamide, 2,2'-azobis-(2-amidinopropane)dihydrochloride, dimethyl 2,2'-azobis(isobutyrate), azobis-cyanovaleric acid, 1,1'-azobis-(2,4-dimethylvaleronitrile), azobismethylbutyronitrile, and 2,2'-azobis-(4-methoxy-2,4-dimethylvaleronitrile). These may be used alone or in combinations of two or more. Azobisisobutyronitrile (AIBN) is preferred among these.

Any organic oxide may be used, including for example di-tert-butyl peroxide, tert-butyl hydroperoxide, paramenthane hydroperoxide, diisopropylbenzene hydroperoxide, diisopropylbenzene hydroperoxide, acetylcyclohexanesulfonyl peroxide, diisopropyl perdicarbonate, di-secondary-butyl perdicarbonate, benzoyl peroxide, and lauroyl peroxide. Examples of the azo compounds include azobisisobutyronitrile, azobismethoxydimethylvaleronitrile, azobisdimethylvaleronitrile, and azobisaminopropane hydrochloride. These may be used alone or in combinations of two or more.

Any dihalogen may be used, including for example chlorine, bromine, and iodine. These may be used alone or in combinations of two or more.

The redox initiators may be any combination of a peroxide with a reducing agent, examples of which include combinations of hydrogen peroxide with iron (II) salts and combinations of peroxide salts such as potassium peroxodisulfate with sodium hydrogen sulfite. These may be used alone or in combinations of two or more.

Preferred among the radical generators are azo compounds, with azobisisobutyronitrile (AIBN) being more preferred.

<<Reactant Having at Least One Heteroatom and at Least One Carbon-Carbon Double Bond>>

The reactant having at least one heteroatom and at least one carbon-carbon double bond may be any reactant that has at least one heteroatom and at least one carbon-carbon double bond. Such reactants may be used alone or in combinations of two or more.

Any heteroatom may be used, including for example an oxygen atom, a nitrogen atom, a silicon atom, and a sulfur atom. Among these, the reactant preferably has an oxygen atom and a nitrogen atom, and more preferably has one oxygen atom and one nitrogen atom.

The number of carbon-carbon double bonds in the reactant is not limited, but is preferably one.

Specifically, the reactant may be any compound capable of forming a group that changes its hydrophilicity with changes in temperature (temperature-responsive polymer (temperature-responsive polymer group)) as described above, and is preferably a compound capable of forming the group that changes its hydrophilicity with changes in temperature (temperature-responsive polymer (temperature-responsive polymer group)) by radical polymerization.

Since temperature-responsive polymers feature a structure containing both a hydrophobic group and a hydrophilic group, the compound (monomer) capable of forming a temperature-responsive polymer inevitably has at least one heteroatom.

The reactant is preferably a compound capable of forming a group that shows a lower critical solution temperature in water, more preferably a compound capable of forming a poly(N-substituted (meth)acrylamide), still more preferably a compound capable of forming a group represented by formula (I), particularly preferably a compound capable of forming poly(N-isopropylacrylamide).

For example, a polymer composite having PNIPAM may be produced by using, as the reactant, isopropylacrylamide (NIPAM) which is the monomer that forms PNIPAM.

More specific examples of the reactant include alkylacrylamides such as isopropylacrylamide (NIPAM) which is the monomer that forms PNIPAM, ethylacrylamide, n-propylacrylamide (NNPAM) which is the monomer that forms PNNPAM, ethyl, methylacrylamide, diethylacrylamide (NDEAM) which is the monomer that forms PNDEAM, isopropyl, methylacrylamide (NMNIPAM) which is the monomer that forms PNMNIPAM, cyclopropylacrylamide, acryloylpyrrolidine, and acryloylpiperidine;

alkylmethacrylamides such as isopropylmethacrylamide, ethylmethacrylamide, n-propylmethacrylamide, ethyl, methylmethacrylamide, diethylmethacrylamide, isopropyl, methylmethacrylamide, cyclopropylmethacrylamide, methacryloylpyrrolidine, and methacryloylpiperidine;

alkyl vinyl ethers such as methyl vinyl ether, ethyl vinyl ether, propyl vinyl ether, butyl vinyl ether, pentenyl ether, hexyl vinyl ether, heptyl vinyl ether, and octyl ether; and vinyl-caprolactam, 2-alkyl-2-oxazolines, ethoxyethylacrylamide, ethoxyethylmethacrylamide, tetrahydrofurfurylacrylamide, tetrahydrofurfurylmethacrylamide, vinyl methyl ether, 2-(dimethylamino)ethyl methacrylate, 3-ethyl-N-vinyl-2-pyrrolidone, and monomers of epoxide/allyl glycidyl ether copolymers. These may be used alone or in combinations of two or more. Alkylacrylamides are preferred among these. More preferred are isopropylacrylamide (NIPAM), n-propylacrylamide (NNPAM), diethylacrylamide (NDEAM), and isopropyl, methylacrylamide (NMNIPAM), with isopropylacrylamide (NIPAM) being still more preferred.

Also preferred are alkyl vinyl ethers. More preferred are methyl vinyl ether, ethyl vinyl ether, propyl vinyl ether, butyl vinyl ether, pentenyl ether, hexyl vinyl ether, heptyl vinyl ether, and octyl ether, with ethyl vinyl ether (EVE) being still more preferred.

<<Solvent>>

Any solvent may be used, including for example at least one solvent selected from the group consisting of hydrocarbon solvents, aromatic solvents, and aprotic polar solvents. These may be used alone or in combinations of two or more. The solvent may be selected appropriately according to the radical generation temperature of the radical generator used.

Any hydrocarbon solvent may be used, including for example linear hydrocarbon solvents such as pentane, hexane, heptane, and octane, and cyclic hydrocarbon solvents such as cyclohexane and terpene solvents. These may be used alone or in combinations of two or more.

Any aromatic solvent may be used, including for example aromatic hydrocarbon solvents such as benzene, toluene, ethylbenzene, and xylene, and heterocyclic aromatic solvents such as pyridine. These may be used alone or in combinations of two or more.

Any aprotic polar solvent may be used, including for example diethyl ether, tetrahydrofuran, dimethylsulfoxide, dimethylformamide, and dimethylacetamide. These may be used alone or in combinations of two or more.

Preferred among the solvents are hydrocarbon solvents, with linear hydrocarbon solvents or cyclic hydrocarbon solvents being more preferred, with hexane or cyclohexane being still more preferred.

Also preferred are aprotic polar solvents, with tetrahydrofuran being more preferred.

<<Stirring>>

The polymer composite may be formed by stirring the conjugated diene polymer, the radical generator, and the reactant in the solvent at a temperature of at least 40° C. but not higher than 200° C.

The temperature during the stirring is preferably at least 40° C. but not higher than 200° C. At a temperature of at least 40° C., the reaction tends to proceed sufficiently, while at a temperature of not higher than 200° C., degradation of the conjugated diene polymer tends to be inhibited. The lower limit is more preferably at least 50° C., still more preferably at least 60° C., while the upper limit is more preferably not higher than 180° C., still more preferably not higher than 160° C., particularly preferably not higher than 140° C., most preferably not higher than 120° C. When the temperature is within the range indicated above, the advantageous effect tends to be better achieved.

The stirring method and the stirring rate are not limited as long as the components in the solvent are miscible with each other.

The stirring time (reaction time) is not limited, but is preferably 0.5 hours or longer, more preferably 1 hour or longer, still more preferably 2 hours or longer, particularly preferably 4 hours or longer. The upper limit is not limited, but is preferably 24 hours or shorter, more preferably 12 hours or shorter, still more preferably 6 hours or shorter. When the stirring time is within the range indicated above, the advantageous effect tends to be better achieved.

The amounts of the conjugated diene polymer, radical generator, reactant, and solvent used to produce the polymer composite are not limited, but are preferably as described below. When the amounts are within the ranges indicated below, the advantageous effect tends to be better achieved.

The amount of the reactant(s) used per 100 parts by mass of the conjugated diene polymer(s) is preferably 1 part by mass or more, more preferably 3 parts by mass or more, but is preferably 200 parts by mass or less, more preferably 120 parts by mass or less.

The amount of the radical generator(s) used per 100 mol of the reactant(s) is preferably 0.001 mol or more, more preferably 0.01 mol or more, but is preferably 1.0 mol or less, more preferably 0.1 mol or less.

The amount of the solvent(s) used is not limited as long as the conjugated diene polymer, radical generator, and reactant are sufficiently miscible. For example, the amount is about 18 times (mL/g) the amount of monomers used.

The ends of a temperature-responsive polymer (for example, a group represented by any of formulas (I) to (IV)) are described.

In the case of the polymer composite grafted with a temperature-responsive polymer, one end of the temperature-responsive polymer forms the backbone or a bond to the backbone, and the other end is usually a hydrogen atom but may be bound to a radical generator such as azobisisobutyronitrile (AIBN).

The amount of the group(s) that changes its hydrophilicity with changes in temperature (the group(s) formed from the reactant(s)) based on 100% by mass of the polymer composite is preferably 1% by mass or more, more preferably 5% by mass or more, still more preferably 10% by mass or more, particularly preferably 20% by mass or more, most preferably 30% by mass or more, but is preferably 70% by mass or less, more preferably 60% by mass or less, still more preferably 55% by mass or less. When the amount is within the range indicated above, the advantageous effect tends to be better achieved.

The amount of the conjugated diene polymer(s) based on 100% by mass of the polymer composite is preferably 30% by mass or more, more preferably 40% by mass or more, still more preferably 45% by mass or more, but is preferably 99% by mass or less, more preferably 95% by mass or less, still more preferably 90% by mass or less, particularly preferably 80% by mass or less, most preferably 70% by mass or less. When the amount is within the range indicated above, the advantageous effect tends to be better achieved.

The combined amount of the group(s) that changes its hydrophilicity with changes in temperature (the group(s) formed from the reactant(s)) and the conjugated diene polymer(s) based on 100% by mass of the polymer composite is preferably 80% by mass or more, more preferably 85% by mass or more, still more preferably 90% by mass or more, particularly preferably 95% by mass or more, most preferably 98% by mass or more, and may be 100% by mass. When the combined amount is within the range indicated above, the advantageous effect tends to be better achieved. Here, the amounts of the group(s) that changes its hydrophilicity with changes in temperature (the group(s) formed from the reactant(s)) and the conjugated diene polymer(s) in the polymer composite are measured by NMR.

Since the group that changes its hydrophilicity with changes in temperature is bound to the conjugated diene polymer in the polymer composite, the group that changes its hydrophilicity with changes in temperature can be inhibited from dissolving in water or otherwise running off.

Here, merely mixing the conjugated diene polymer with the group that changes its hydrophilicity with changes in temperature (temperature-responsive polymer) does not cause binding of the conjugated diene polymer to the group that changes its hydrophilicity with changes in temperature, failing to provide the polymer composite. Moreover, if a rubber composition is compounded with the temperature-responsive polymer alone, not in the form of the polymer composite, the temperature-responsive polymer may dissolve in water or otherwise run off the rubber composition, namely, may dissolve and disappear from the composition in rainy weather. Thus, it cannot be used in a tread rubber which contacts water in rainy weather, and also cannot provide the advantageous effect as it runs off.

The polymer composite can be used as a rubber component for rubber compositions. The polymer composite may include a single polymer composite or a combination of two or more polymer composites.

The polymer composite is preferably a polymer composite in which a group that shows a lower critical solution temperature (LCST) in water is bound to BR or SBR, more preferably a polymer composite in which a group that shows a lower critical solution temperature (LCST) in water is bound to SBR.

(Rubber Component)

Since the polymer composite contains the conjugated diene polymer, only the conjugated diene polymer in the polymer composite may be used as a rubber component, but preferably the conjugated diene polymer in the polymer composite is used together with additional rubber components.

Examples of such additional rubber components include the above-mentioned diene rubbers. These may be used alone or in combinations of two or more.

Here, the additional rubber components and their suitable embodiments may be as described for the conjugated diene polymer.

The amount of the polymer composite(s) in the rubber composition is preferably adjusted so that the amount of the group(s) that changes its hydrophilicity with changes in temperature (the group(s) formed from the reactant(s)) per 100 parts by mass of the rubber component content is preferably 1 part by mass or more, more preferably 3 parts by mass or more, still more preferably 5 parts by mass or more, particularly preferably 8 parts by mass or more, but is preferably 200 parts by mass or less, more preferably 180 parts by mass or less, still more preferably 160 parts by mass or less, particularly preferably 140 parts by mass or less, most preferably 120 parts by mass or less, still most preferably 100 parts by mass or less, further most preferably 80 parts by mass or less, particularly most preferably 50 parts by mass or less, more particularly most preferably 30 parts by mass or less. When the amount is within the range indicated above, the advantageous effect tends to be better achieved.

The amount of SBR based on 100% by mass of the rubber component content is preferably 20% by mass or more, more preferably 40% by mass or more, still more preferably 50% by mass or more, and may be 100% by mass, while the amount is preferably 90% by mass or less, more preferably 80% by mass or less. When the amount is within the range indicated above, the advantageous effect tends to be better achieved.

The amount of BR based on 100% by mass of the rubber component content is preferably 5% by mass or more, more preferably 10% by mass or more, still more preferably 20% by mass or more, and may be 100% by mass, while the amount is preferably 60% by mass or less, more preferably 50% by mass or less. When the amount is within the range indicated above, the advantageous effect tends to be better achieved.

The combined amount of SBR and BR based on 100% by mass of the rubber component content is preferably 60% by mass or more, more preferably 80% by mass or more, still more preferably 90% by mass or more, and may be 100% by mass. When the combined amount is within the range indicated above, the advantageous effect tends to be better achieved.

Moreover, a multi-component copolymer containing a conjugated diene unit, a non-conjugated olefin unit, and an aromatic vinyl unit is preferably present as a rubber component. In this case, the advantageous effect tends to be more suitably achieved.

The conjugated diene unit in the multi-component copolymer is a structural unit derived from a conjugated diene compound. Examples of the conjugated diene compound include 1,3-butadiene, isoprene, 1,3-pentadiene, 2,3-dimethylbutadiene, 2-phenyl-1,3-butadiene, and 1,3-hexadiene. These may be used alone or in combinations of two or more. Preferred are 1,3-butadiene and isoprene, with 1,3-butadiene being more preferred.

The non-conjugated olefin unit in the multi-component copolymer is a structural unit derived from a non-conjugated olefin. Examples of the non-conjugated olefin include ethylene, propylene, 1-butene, 1-pentene, 1-hexene, 1-heptene, and 1-octene. These may be used alone or in combinations of two or more. Preferred are ethylene, propylene, and 1-butene, with ethylene being more preferred.

The aromatic vinyl unit in the multi-component copolymer is a structural unit derived from an aromatic vinyl compound. Examples of the aromatic vinyl compound include styrene, α-methylstyrene, 1-vinylnaphthalene, 3-vinyltoluene, ethylvinylbenzene, divinylbenzene, 4-cyclohexylstyrene, and 2,4,6-trimethylstyrene. These may be used alone or in combinations of two or more. Preferred are styrene and α-methylstyrene, with styrene being more preferred.

For example, the multi-component copolymer may be prepared by copolymerizing a conjugated diene compound, a non-conjugated olefin, and an aromatic vinyl compound, or by copolymerizing a combination of a conjugated diene compound and an aromatic vinyl compound or a combination of a conjugated diene compound, a non-conjugated olefin, and an aromatic vinyl compound, and then hydrogenating the copolymer to convert some conjugated diene units to non-conjugated olefin units. In other words, the multi-component copolymer may be a copolymer of a conjugated diene compound, a non-conjugated olefin, and an aromatic vinyl compound, or may be a hydrogenated product (hydrogenated copolymer) of a copolymer of a conjugated diene compound and an aromatic vinyl compound or a copolymer of a conjugated diene compound, a non-conjugated olefin, and an aromatic vinyl compound. Each of these copolymers may be used alone, or two or more of these may be used in combination. Among these, the multi-component copolymer is preferably a hydrogenated product of a copolymer of a conjugated diene compound and an aromatic vinyl compound, more preferably a hydrogenated styrene-butadiene copolymer (hydrogenated SBR).

The multi-component copolymer may be prepared by any polymerization method such as random polymerization or block polymerization, preferably by random polymerization.

When the multi-component copolymer is a hydrogenated copolymer, the hydrogenation may be performed by any method under any reaction condition, including known methods and known conditions. Usually, the hydrogenation is performed at 20 to 150° C. under an elevated hydrogen pressure of 0.1 to 10 MPa in the presence of a hydrogenation catalyst. Other methods and conditions related to production processes are not limited either, and, for example, those described in WO 2016/039005 above may be used.

When the multi-component copolymer is a hydrogenated copolymer, the degree of hydrogenation based on 100 mol % of the total conjugated diene units before hydrogenation is preferably 65 mol % or higher, more preferably 70 mol % or higher, still more preferably 80 mol % or higher, but is preferably 95 mol % or lower, more preferably 94.5 mol % or lower, still more preferably 94 mol % or lower. When the degree of hydrogenation is within the range indicated above, the advantageous effect tends to be better achieved.

Here, the degree of hydrogenation can be calculated from the rate of decrease in the unsaturated bond signals in the $^1$H-NMR spectrum measured.

The conjugated diene unit content based on 100 mol % of the total structural units of the multi-component copolymer is preferably 1.9 mol % or higher, more preferably 2.4 mol % or higher, still more preferably 2.9 mol % or higher, but is preferably 23.7 mol % or lower, more preferably 16.9 mol % or lower, still more preferably 10.7 mol % or lower. When the content is within the range indicated above, the advantageous effect tends to be better achieved.

The non-conjugated olefin unit content based on 100 mol % of the total structural units of the multi-component copolymer is preferably higher than 65 mol %, more preferably 70 mol % or higher, still more preferably 80 mol % or higher, but is preferably lower than 95 mol %, more preferably 94.5 mol % or lower, still more preferably 94 mol % or lower. When the content is within the range indicated above, the advantageous effect tends to be better achieved.

The aromatic vinyl unit content based on 100 mol % of the total structural units of the multi-component copolymer is preferably 4 mol % or higher, more preferably 8 mol % or higher, but is preferably 45 mol % or lower, more preferably 40 mol % or lower, still more preferably 35 mol % or lower, particularly preferably 25 mol % or lower, most preferably 20 mol % or lower. When the content is within the range indicated above, the advantageous effect tends to be better achieved.

The structural unit contents of the multi-component copolymer are measured by NMR.

The weight average molecular weight (Mw) of the multi-component copolymer is preferably 100,000 or more, more preferably 150,000 or more, still more preferably 200,000 or more, particularly preferably 400,000 or more, but is preferably 2,000,000 or less, more preferably 1,500,000 or less, still more preferably 1,000,000 or less, particularly preferably 600,000 or less. When the Mw is within the range indicated above, the advantageous effect tends to be better achieved.

The amount of the multi-component copolymer(s) based on 100% by mass of the rubber component content is preferably 20% by mass or more, more preferably 40% by mass or more, still more preferably 50% by mass or more, and may be 100% by mass, while the amount is preferably 90% by mass or less, more preferably 80% by mass or less. When the amount is within the range indicated above, the advantageous effect tends to be better achieved.

(Silica)

The rubber composition preferably contains silica as a filler (reinforcing filler).

Any silica may be used, and examples include dry silica (anhydrous silicic acid) and wet silica (hydrous silicic acid). These may be used alone or in combinations of two or more. Wet silica is preferred among these because it has a large number of silanol groups.

Examples of commercial silica include those available from Degussa, Rhodia, Tosoh Silica Corporation, Solvay Japan, Tokuyama Corporation, etc.

The nitrogen adsorption specific surface area ($N_2SA$) of the silica is preferably 50 $m^2/g$ or more, more preferably 150 $m^2/g$ or more, still more preferably 160 $m^2/g$ or more, particularly preferably 180 $m^2/g$ or more, most preferably 200 $m^2/g$ or more, further most preferably 220 $m^2/g$ or more. The upper limit of the $N_2SA$ of the silica is not limited, but is preferably 600 $m^2/g$ or less, more preferably 350 $m^2/g$ or less, still more preferably 260 $m^2/g$ or less. When the $N_2SA$ is within the range indicated above, the advantageous effect tends to be more suitably achieved.

Here, the $N_2SA$ of the silica is measured by a BET method in accordance with ASTM D3037-93.

The cetyltrimethylammonium bromide adsorption specific surface area (CTAB specific surface area, CTAB) of the silica is preferably 160 $m^2/g$ or more, more preferably 170 $m^2/g$ or more, still more preferably 180 $m^2/g$ or more, even more preferably 200 $m^2/g$ or more, particularly preferably 220 $m^2/g$ or more, most preferably 250 $m^2/g$ or more, but is preferably 450 $m^2/g$ or less, more preferably 400 $m^2/g$ or less, still more preferably 350 $m^2/g$ or less, even more preferably 330 $m^2/g$ or less, particularly preferably 300 $m^2/g$ or less. When the CTAB is within the range indicated above, the advantageous effect tends to be more suitably achieved.

Here, the CTAB specific surface area of the silica is measured in accordance with JIS K 6217-3 (2001).

The amount of silica per 100 parts by mass of the rubber component content is preferably 10 parts by mass or more, more preferably 20 parts by mass or more, still more preferably 40 parts by mass or more, particularly preferably 60 parts by mass or more, most preferably 80 parts by mass or more, but is preferably 200 parts by mass or less, more preferably 180 parts by mass or less, still more preferably 150 parts by mass or less, particularly preferably 120 parts by mass or less, most preferably 100 parts by mass or less. When the amount is within the range indicated above, the advantageous effect tends to be better achieved.

(Silane Coupling Agent)

When the rubber composition contains silica, it preferably contains a silane coupling agent together with the silica.

Any silane coupling agent may be used. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 2-triethoxysilylethyl-N,N-dimethylthiocarbamoyltetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone or in combinations of two or more. Sulfide silane coupling agents are preferred among these.

Examples of commercial silane coupling agents include those available from Degussa, Momentive, Shin-Etsu Silicone, Tokyo Chemical Industry Co., Ltd., AZmax. Co., Dow Corning Toray Co., Ltd., etc.

The amount of silane coupling agents, if present, per 100 parts by mass of the silica content is preferably 0.1 parts by mass or more, more preferably 1 part by mass or more, still more preferably 2 parts by mass or more. The amount is also preferably 20 parts by mass or less, more preferably 15 parts by mass or less, still more preferably 12 parts by mass or less. When the amount is within the range indicated above, the advantageous effect tends to be better achieved.

(Carbon Black)

The rubber composition preferably contains carbon black as a filler (reinforcing filler). In this case, the advantageous effect tends to be more suitably achieved.

Examples of the carbon black include N134, N110, N220, N234, N219, N339, N330, N326, N351, N550, and N762. These may be used alone or in combinations of two or more.

The nitrogen adsorption specific surface area ($N_2SA$) of the carbon black is preferably 5 $m^2/g$ or more, more preferably 30 $m^2/g$ or more, still more preferably 60 $m^2/g$ or more, particularly preferably 90 $m^2/g$ or more, most preferably 120 $m^2/g$ or more. The $N_2SA$ is also preferably 300 $m^2/g$ or less, more preferably 200 $m^2/g$ or less, still more preferably 180 $m^2/g$ or less. When the $N_2SA$ is within the range indicated above, the advantageous effect tends to be better achieved.

Here, the nitrogen adsorption specific surface area of the carbon black can be determined in accordance with JIS K 6217-2:2001.

The dibutyl phthalate oil absorption (DBP) of the carbon black is preferably 5 ml/100 g or more, more preferably 70 ml/100 g or more, still more preferably 90 ml/100 g or more. The DBP is also preferably 300 ml/100 g or less, more preferably 200 ml/100 g or less, still more preferably 160 ml/100 g or less, particularly preferably 140 ml/100 g or less. When the DBP is within the range indicated above, the advantageous effect tends to be better achieved.

Here, the DBP of the carbon black can be measured in accordance with JIS K6217-4:2001.

Examples of commercial carbon black include those available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The amount of carbon black per 100 parts by mass of the rubber component content is preferably 0.1 parts by mass or more, more preferably 1 part by mass or more, still more preferably 3 parts by mass or more, particularly preferably 5 parts by mass or more, but is preferably 120 parts by mass or less, more preferably 80 parts by mass or less, still more preferably 50 parts by mass or less, particularly preferably 20 parts by mass or less. When the amount is within the range indicated above, the advantageous effect tends to be better achieved.

(Sulfur)

The rubber composition preferably contains sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

Examples of commercial sulfur include those available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc.

The amount of sulfur per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

(Vulcanization Accelerator)

The rubber composition preferably contains a vulcanization accelerator.

Examples of the vulcanization accelerator include thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazolylsulfenamide, N-t-butyl-2-benzothiazolylsulfenamide, N-oxyethylene-2-benzothiazole sulfenamide, and N,N'-diisopropyl-2-benzothiazole sulfenamide; guanidine vulcanization accelerators such as diphenylguanidine, diorthotolylguanidine, and orthotolylbiguanidine; thiourea vulcanization accelerators; dithiocarbamate vulcanization accelerators; aldehyde-amine or aldehyde-ammonia vulcanization accelerators; imidazoline vulcanization accelerators; and xanthate vulcanization accelerators. These may be used alone or in combinations of two or more. Sulfenamide or guanidine vulcanization accelerators are preferred among these.

Examples of commercial vulcanization accelerators include those available from Kawaguchi Chemical Industry Co., Ltd., Ouchi Shinko Chemical Industrial Co., Ltd., Rhein Chemie, etc.

The amount of vulcanization accelerators per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

(Stearic Acid)

The rubber composition preferably contains stearic acid.

Conventionally known stearic acid may be used, including, for example, those available from NOF Corporation, Kao Corporation, Fujifilm Wako Pure Chemical Corporation, Chiba Fatty Acid Co., Ltd., etc.

The amount of stearic acid per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

(Zinc Oxide)

The rubber composition may contain zinc oxide.

Conventionally known zinc oxide may be used, including, for example, those available from Mitsui Mining & Smelting Co., Ltd., Toho Zinc Co., Ltd., HakusuiTech Co., Ltd., Seido Chemical Industry Co., Ltd., Sakai Chemical Industry Co., Ltd., etc.

The amount of zinc oxide per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

(Antioxidant)

The rubber composition may contain an antioxidant.

Examples of the antioxidant include naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as polymerized 2,2,4-trimethyl-1,2-dihydroquinoline; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. These may be used alone or in combinations of two or more. Preferred among these are p-phenylenediamine or quinoline antioxidants.

Examples of commercial antioxidants include those available from Seiko Chemical Co., Ltd., Sumitomo Chemical Co., Ltd., Ouchi Shinko Chemical Industrial Co., Ltd., Flexsys, etc.

The amount of antioxidants per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

(Wax)

The rubber composition may contain a wax.

Any wax may be used, and examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more.

Examples of commercial waxes include those available from Ouchi Shinko Chemical Industrial Co., Ltd., Nippon Seiro Co., Ltd., Seiko Chemical Co., Ltd., etc.

The amount of waxes per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

(Plasticizer)

The rubber composition may contain a plasticizer.

Herein, the term "plasticizer" refers to a material that imparts plasticity to rubbers, and conceptually includes liquid plasticizers (plasticizers that are liquid at 25° C.) and solid plasticizers (plasticizers that are solid at 25° C.). Specifically, it is a component that can be extracted with acetone from the composition. Such plasticizers may be used alone or in combinations of two or more.

Specific examples of the plasticizers include oils, ester plasticizers, liquid polymers, and resin components (also collectively referred to as oils, etc.). These may be used alone or in combinations of two or more. The term "liquid polymer" refers to a polymer that is liquid at room temperature (25° C.). The term "resin component" refers to a resin that is liquid at room temperature (25° C.) or a resin that is solid at room temperature (25° C.). To more suitably achieve the advantageous effect, oils, liquid polymers, and resin components are preferred among these, with liquid polymers or resin components being more preferred, with resin components being still more preferred.

The amount of plasticizers per 100 parts by mass of the rubber component content is preferably 0.1 parts by mass or more, more preferably 5 parts by mass or more, still more preferably 10 parts by mass or more, particularly preferably 20 parts by mass or more. The amount is also preferably 100 parts by mass or less, more preferably 80 parts by mass or less, still more preferably 60 parts by mass or less, particularly preferably 40 parts by mass or less. When the amount is within the range indicated above, the advantageous effect tends to be better achieved.

Any oil may be used, and examples include conventional oils, including: process oils such as paraffinic process oils, aromatic process oils, and naphthenic process oils; low polycyclic aromatic (PCA) process oils such as TDAE and MES; vegetable oils; and mixtures of the foregoing oils. These may be used alone or in combinations of two or more. Aromatic process oils are preferred among these. Specific examples of the aromatic process oils include Diana Process Oil AH series produced by Idemitsu Kosan Co., Ltd.

Examples of commercial oils include those available from Idemitsu Kosan Co., Ltd., Sankyo Yuka Kogyo K.K., Japan Energy Corporation, Olisoy, H&R, Hokoku Corporation, Showa Shell Sekiyu K.K., Fuji Kosan Co., Ltd., etc.

The amount of oils per 100 parts by mass of the rubber component content is preferably 0.1 parts by mass or more, more preferably 5 parts by mass or more, still more preferably 10 parts by mass or more, particularly preferably 20 parts by mass or more. The amount is also preferably 100 parts by mass or less, more preferably 80 parts by mass or less, still more preferably 60 parts by mass or less, particularly preferably 40 parts by mass or less. When the amount is within the range indicated above, the advantageous effect tends to be better achieved.

Examples of the ester plasticizers include the vegetable oils mentioned above; synthetic plasticizers and processed vegetable oils, such as glycerol fatty acid monoesters, glycerol fatty acid diesters, and glycerol fatty acid triesters; and phosphoric acid esters (e.g., phosphate plasticizers and mixtures thereof). These may be used alone or in combinations of two or more.

Suitable examples of the ester plasticizers include fatty acid esters represented by the following formula:

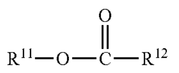

wherein $R^{11}$ represents a C1-C8 linear or branched alkyl group, a C1-C8 linear or branched alkenyl group, or a C2-C6 linear or branched alkyl group substituted with 1 to 5 hydroxy groups; and $R^{12}$ represents a C11-C21 alkyl or alkenyl group.

Examples of $R^{11}$ include methyl, ethyl, 2-ethylhexyl, isopropyl, and octyl groups, and groups obtained by substituting these groups with 1 to 5 hydroxy groups. Examples of $R^{12}$ include linear or branched alkyl or alkenyl groups such as lauryl, myristyl, palmityl, stearyl, and oleyl groups.

Examples of the fatty acid esters include alkyl oleates, alkyl stearates, alkyl linoleates, and alkyl palmitates. Alkyl oleates (e.g., methyl oleate, ethyl oleate, 2-ethylhexyl oleate, isopropyl oleate, octyl oleate) are preferred among these. In this case, the amount of alkyl oleates based on 100% by mass of the amount of fatty acid esters is preferably 80% by mass or more.

Other examples of the fatty acid esters include fatty acid monoesters or diesters formed from fatty acids (e.g., oleic acid, stearic acid, linoleic acid, palmitic acid) and alcohols (e.g., ethylene glycol, glycerol, trimethylolpropane, pentaerythritol, erythritol, xylitol, sorbitol, dulcitol, mannitol, inositol). Oleic acid monoesters are preferred among these. In this case, the amount of oleic acid monoesters based on 100% by mass of the combined amount of fatty acid monoesters and fatty acid diesters is preferably 80% by mass or more.

Phosphoric acid esters can be suitably used as ester plasticizers.

Preferred phosphoric acid esters include C12-C30 compounds, among which C12-C30 trialkyl phosphates are suitable. Here, the number of carbon atoms of the trialkyl phosphates means the total number of carbon atoms in the three alkyl groups. The three alkyl groups may be the same or different groups. Examples of the alkyl groups include linear or branched alkyl groups which may contain a heteroatom such as an oxygen atom or may be substituted with a halogen atom such as fluorine, chlorine, bromine, or iodine.

Other examples of the phosphoric acid esters include known phosphoric acid ester plasticizers such as: mono-, di-, or triesters of phosphoric acid with C1-C12 monoalcohols or their (poly)oxyalkylene adducts; and compounds obtained by substituting one or two alkyl groups of the aforementioned trialkyl phosphoates with phenyl group(s). Specific examples include tris(2-ethylhexyl)phosphate, trimethyl phosphate, triethyl phosphate, tributyl phosphate, trioctyl phosphate, triphenyl phosphate, tricresyl phosphate, trixylenyl phosphate, cresyl diphenyl phosphate, 2-ethylhexyl diphenyl phosphate, and tris(2-butoxyethyl)phosphate.

Examples of the liquid polymers include liquid rubbers and liquid farnesene polymers. These may be used alone or in combinations of two or more. To more suitably achieve the advantageous effect, liquid farnesene polymers are preferred among these.

Examples of the liquid rubbers include liquid diene rubbers which can be extracted with acetone. Specific examples include liquid styrene-butadiene copolymers (liquid SBR), liquid polybutadiene polymers (liquid BR), liquid polyisoprene polymers (liquid IR), liquid styrene-isoprene copolymers (liquid SIR), liquid styrene-butadiene-styrene block copolymers (liquid SBS block polymers), and liquid styrene-isoprene-styrene block copolymers (liquid SIS block polymers), all of which are liquid at 25° C. The chain end or backbone of these rubbers may be modified with a polar group. Hydrogenated products of these rubbers are also usable. These may be used alone or in combinations of two or more.

The term "liquid farnesene polymer" refers to a polymer produced by polymerizing farnesene, and contains a farnesene-based structural unit. Farnesene has isomers such as α-farnesene ((3E,7E)-3,7,11-trimethyl-1,3,6,10-dodecatetraene) and β-farnesene (7,11-dimethyl-3-methylene-1,6,10-dodecatriene). Preferred is (E)-β-farnesene having the following structure:

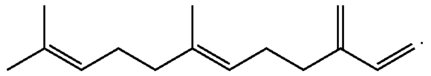

The liquid farnesene polymers may be either homopolymers of farnesene (farnesene homopolymers) or copolymers of farnesene and vinyl monomers (farnesene-vinyl monomer copolymers). These may be used alone or in combinations of two or more. Copolymers of farnesene and vinyl monomers are preferred among these.

Examples of the vinyl monomers include aromatic vinyl compounds such as styrene, 2-methylstyrene, 3-methylstyrene, 4-methylstyrene, α-methylstyrene 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene, and tertiary amino group-containing diphenylethylenes, and conjugated diene compounds such as butadiene and isoprene. These may be used alone or in combinations of two or more. Butadiene is preferred among these. In other words, copolymers of farnesene and butadiene (farnesene-butadiene copolymers) are preferred among the farnesene-vinyl monomer copolymers.

The copolymerization ratio of farnesene and vinyl monomers (farnesene/vinyl monomers) of the farnesene-vinyl monomer copolymers is preferably 40/60 to 90/10 by mass.

Liquid farnesene polymers having a weight average molecular weight (Mw) of 3,000 to 300,000 may be suitably used. The Mw of the liquid farnesene polymers is preferably 8,000 or more, more preferably 10,000 or more, but is preferably 100,000 or less, more preferably 60,000 or less, still more preferably 50,000 or less. When the Mw is within the range indicated above, the advantageous effect tends to be more suitably achieved.

The amount of liquid polymers per 100 parts by mass of the rubber component content is preferably 0.1 parts by mass or more, more preferably 5 parts by mass or more, still more preferably 10 parts by mass or more, particularly preferably 20 parts by mass or more. The amount is also preferably 100 parts by mass or less, more preferably 80 parts by mass or less, still more preferably 60 parts by mass or less, particularly preferably 40 parts by mass or less. When the amount is within the range indicated above, the advantageous effect tends to be better achieved.

The amount of resin components as described above (the combined amount of resins that are liquid at room temperature (25° C.) and resins that are solid at room temperature (25° C.)) is preferably 5 parts by mass or more, more preferably 8 parts by mass or more, but is preferably 60 parts by mass or less, more preferably 40 parts by mass or less, still more preferably 20 parts by mass or less. When the amount is within the range indicated above, the advantageous effect tends to be better achieved.

Examples of the resins that are liquid at room temperature (25° C.) as resin components include liquid resins. The liquid resins may be those which have a melting point not higher than room temperature and are liquid at room temperature. Examples of the liquid resins include terpene resins (including terpene phenol resins and aromatic modified terpene resins), rosin resins, styrene resins, C5 resins, C9 resins, C5/C9 resins, dicyclopentadiene (DCPD) resins, coumarone-indene resins (including resins based on coumarone or indene alone), phenol resins, olefin resins, polyurethane resins, and acrylic resins. Hydrogenated products of the foregoing resins are also usable. These may be used alone or in combinations of two or more.

The amount of liquid resins per 100 parts by mass of the rubber component content in the rubber composition is preferably 5 parts by mass or more, more preferably 8 parts by mass or more, but is preferably 60 parts by mass or less, more preferably 40 parts by mass or less, still more preferably 20 parts by mass or less. When the amount is within the range indicated above, the advantageous effect tends to be better achieved.

Examples of the resins that are solid at room temperature (25° C.) (hereinafter, also referred to as "solid resins") as resin components include aromatic vinyl polymers, coumarone-indene resins, coumarone resins, indene resins, phenol resins, rosins resins, petroleum resins, terpene resins, and acrylic resins, all of which are solid at room temperature (25° C.). The resins may also be hydrogenated. These may be used alone or in combinations of two or more. To more suitably achieve the advantageous effect, aromatic vinyl polymers, terpene resins, petroleum resins, and hydrogenated products thereof are preferred among these, with aromatic vinyl polymers being more preferred.

The softening point of the solid resins is preferably 60° C. or higher, more preferably 70° C. or higher, still more preferably 80° C. or higher. The upper limit is preferably 160° C. or lower, more preferably 130° C. or lower, still more preferably 115° C. or lower. When the softening point is within the range indicated above, the advantageous effect tends to be more suitably achieved.

Here, the softening point of the resin components is determined as set forth in JIS K 6220-1:2001 using a ring and ball softening point measuring apparatus and defined as the temperature at which the ball drops down.

The aromatic vinyl polymers refer to polymers containing an aromatic vinyl monomer as a structural unit. Examples include resins produced by polymerizing α-methylstyrene and/or styrene. Specific examples include styrene homopolymers (styrene resins), α-methylstyrene homopolymers (α-methylstyrene resins), copolymers of α-methylstyrene and styrene, and copolymers of styrene and other monomers. Copolymers of α-methylstyrene and styrene are preferred among these.

The coumarone-indene resins refer to resins containing coumarone and indene as the main monomer components forming the skeleton (backbone) of the resins. Examples of monomer components other than coumarone and indene which may be contained in the skeleton include styrene, α-methylstyrene, methylindene, and vinyltoluene. Here, the amount of coumarone-indene resins per 100 parts by mass of the rubber component content is preferably 1 to 200 parts by mass.

The coumarone resins refer to resins containing coumarone as the main monomer component forming the skeleton (backbone) of the resins.

The indene resins refer to resins containing indene as the main monomer component forming the skeleton (backbone) of the resins.

Examples of the phenol resins include known polymers produced by reacting phenol with an aldehyde such as formaldehyde, acetaldehyde, or furfural using an acid or alkali catalyst. Preferred among these are those produced by reaction using an acid catalyst, such as novolac-type phenol resins.

Examples of the rosin resins include rosin-based resins, typically, natural rosins, polymerized rosins, modified rosins, and esterified compounds thereof, and hydrogenated products thereof. Here, the amount of rosin resins per 100 parts by mass of the rubber component content is preferably 1 to 200 parts by mass.

Examples of the petroleum resins include C5 resins, C9 resins, C5/C9 resins, dicyclopentadiene (DCPD) resins, and hydrogenated products of the foregoing resins. DCPD resins or hydrogenated DCPD resins are preferred among these.

The terpene resins refer to polymers containing a terpene as a structural unit. Examples include polyterpene resins produced by polymerizing terpene compounds, and aromatic modified terpene resins produced by polymerizing terpene compounds and aromatic compounds. Hydrogenated products of these resins are also usable.

The polyterpene resins refer to resins produced by polymerizing terpene compounds. The terpene compounds refer to hydrocarbons having a composition represented by $(C_5H_8)_n$ or oxygen-containing derivatives thereof, each of which has a terpene backbone and is classified as a monoterpene ($C_{10}H_{16}$), sesquiterpene ($C_{15}H_{24}$), diterpene ($C_{20}H_{32}$), or other terpene. Examples of the terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include resins made from the above-mentioned terpene compounds, such as pinene resins, limonene resins, dipentene resins, and pinene-limonene resins. Pinene resins are preferred among these. Pinene resins, which usually have two isomers, α-pinene and β-pinene, are classified as β-pinene resins mainly containing β-pinene and α-pinene resins mainly containing α-pinene, depending on the proportions of the components.

Examples of the aromatic modified terpene resins include terpene-phenol resins made from the above-mentioned terpene compounds and phenolic compounds, and terpene-styrene resins made from the above-mentioned terpene compounds and styrene compounds. Terpene-phenol-styrene resins made from the terpene compounds, phenolic compounds, and styrene compounds are also usable. Here, examples of the phenolic compounds include phenol, bisphenol A, cresol, and xylenol, and examples of the styrene compounds include styrene and α-methylstyrene.

The acrylic resins refer to polymers containing an acrylic monomer as a structural unit. Examples include styrene acrylic resins such as those produced by copolymerizing aromatic vinyl monomer components and acrylic monomer components, which contain a carboxyl group. Solvent-free, carboxyl group-containing styrene acrylic resins are suitable among these.

The solvent-free, carboxyl group-containing styrene acrylic resins may be (meth)acrylic resins (polymers) synthesized by high temperature continuous polymerization (high temperature continuous bulk polymerization as described in, for example, U.S. Pat. No. 4,414,370, JP S59-6207 A, JP H5-58005 B, JP H1-313522 A, U.S. Pat. No. 5,010,166, and annual research report TREND 2000 issued by Toagosei Co., Ltd., vol. 3, pp. 42-45) using no or minimal amounts of auxiliary raw materials such as polymerization initiators, chain transfer agents, and organic solvents. Herein, the term "(meth)acrylic" means methacrylic and acrylic.

Examples of the acrylic monomer components of the acrylic resins include (meth)acrylic acid and (meth)acrylic acid derivatives such as (meth)acrylic acid esters (e.g., alkyl esters, aryl esters, and aralkyl esters, such as 2-ethylhexyl acrylate), (meth)acrylamide, and (meth)acrylamide derivatives. Here, the term "(meth)acrylic acid" is a general term for acrylic acid and methacrylic acid.

Examples of the aromatic vinyl monomer components of the acrylic resins include aromatic vinyls such as styrene, α-methylstyrene, vinyltoluene, vinylnaphthalene, divinylbenzene, trivinylbenzene, and divinylnaphthalene.

In addition to the (meth)acrylic acid or (meth)acrylic acid derivatives and aromatic vinyls, other monomer components may also be used as the monomer components of the acrylic resins.

The amount of solid resins per 100 parts by mass of the rubber component content is preferably 5 parts by mass or more, more preferably 8 parts by mass or more, but is preferably 60 parts by mass or less, more preferably 40 parts by mass or less, still more preferably 20 parts by mass or less. When the amount is within the range indicated above, the advantageous effect tends to be better achieved.

Examples of commercial plasticizers include those available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., Novares-Rutgers, Sartomer, Kuraray Co., Ltd., etc.

In addition to the above-mentioned components, the rubber composition may contain additives commonly used in the tire industry, such as vulcanizing agents other than sulfur (e.g., organic crosslinking agents, organic peroxides), calcium carbonate, mica such as sericite, aluminum hydroxide, magnesium oxide, magnesium hydroxide, clay, talc, alumina, and titanium oxide. The amounts of these components per 100 parts by mass of the polymer component (preferably, rubber component) content is preferably 0.1 parts by mass or more, but is preferably 200 parts by mass or less.

Examples of organic peroxides include benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, and 1,3-bis(t-butylperoxypropyl)benzene. These may be used alone or in combinations of two or more.

The rubber composition may be prepared, for example, by kneading the components using a rubber kneading machine such as an open roll mill or a Banbury mixer, and then vulcanizing the kneaded mixture.

The kneading conditions are as follows. In a base kneading step of kneading additives other than crosslinking agents (vulcanizing agents) and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, preferably 80 to 110° C. Then, the rubber composition obtained after kneading vulcanizing agents and vulcanization accelerators is usually vulcanized by, for example, press vulcanization. The vulcanization temperature is usually 140 to 190° C., preferably 150 to 185° C.

Although the rubber composition is used in a tread (cap tread), it may also be used in tire components such as sidewalls, base treads, undertreads, clinches, bead apexes, breaker cushion rubbers, rubbers for carcass cord topping, insulations, chafers, and innerliners, and side reinforcement layers of run-flat tires.

(Tire)

The tire of the present disclosure may be produced from the rubber composition by usual methods. Specifically, the tire may be produced by extruding the unvulcanized rubber composition, which contains additives as needed, into the shape of a tread (cap tread), followed by forming and assembling it with other tire components in a usual manner on a tire building machine to build an unvulcanized tire, and then heating and pressurizing the unvulcanized tire in a vulcanizer.

The tire may be any type of tire, including pneumatic tires, solid tires, and airless tires. Preferred among these are pneumatic tires.

The tire may be suitably used as a tire for passenger vehicles, large passenger vehicles, large SUVs, trucks and buses, or two-wheeled vehicles, or as a racing tire, a winter tire (studless winter tire, snow tire, studded tire), an all-season tire, a run-flat tire, an aircraft tire, a mining tire, etc. In particular, the tire may be more suitably used as a tire for passenger vehicles.

The tire includes a tread portion which has at least one main groove continuously extending in the tire circumferential direction and has a $S_{50}/S_0$ ratio of more than 1, wherein $S_0$ denotes the sea proportion (%) in the tread ground contact surface of the new tire, and $S_{50}$ denotes the sea proportion (%) when the tread portion is worn until the depth of the main groove reaches 50% of that of the new tire.

In the tire, preferably, the at least one main groove has a groove wall provided with a recessed portion that is recessed outwardly in the groove width direction from the groove edge appearing on the tread surface of the tread portion, and the total recess amount of the main groove is 0.10 to 0.90 times the groove width, which is the length between the groove edges of the main groove.

In the tire, preferably, a first groove wall, which is one of the groove walls of the main groove, is provided with at least one first recessed portion that is recessed outwardly in the groove width direction from the groove edge appearing on the tread surface of the tread portion, and the first recessed portion gradually reduces the amount of recess from the groove edge, from the deepest part that is recessed most outwardly in the groove width direction toward either side of the tire circumferential direction.

In the tire, the first recessed portion is preferably provided on the groove bottom side of the groove wall.

In the tire, the first recessed portion preferably has an arc-like contour portion as viewed in a cross-section taken along the tread surface and passing through the deepest part.

In the tire, the first recessed portion preferably gradually reduces the recess amount from the deepest part toward the outside in the tire radial direction, when viewed in a groove cross-section passing through the deepest part.

In the tire, the amount of recess at the deepest part is preferably 0.10 to 0.50 times the groove width, which is the length between the groove edges of the main groove.

In the tire, the first groove wall is preferably provided with at least one second recessed portion which is recessed outwardly in the groove width direction from the groove edge and in which the amount of recess from the groove edge is constant in the tire circumferential direction.

In the tire, the largest amount of recess of the second recessed portion is preferably smaller than the amount of recess at the deepest part of the first recessed portion.

In the first groove wall of the tire, the first recessed portion and the second recessed portion are preferably provided alternately in the tire circumferential direction.

In the tire, a second groove wall, which is the other groove wall of the main groove, is preferably provided with at least one first recessed portion as described above.

In the tire, preferably, the first groove wall and the second groove wall are each provided with a plurality of first recessed portions as described above, and the first recessed portions in the first groove wall and the first recessed portions in the second groove wall are provided alternately in the tire circumferential direction.

The procedure for producing a tire according to one embodiment of the present disclosure is described in detail below. However, the description below is used as an example to describe the present disclosure and is not intended to limit the technical scope of the present disclosure thereto.

[Tread Pattern]

An exemplary but non-limiting tire according to one embodiment of the present disclosure is shown in FIG. 1. FIG. 1 shows a cross-sectional view of a tread portion 2 of the tire 1. Here, FIG. 1 is a meridional cross-section including the rotational axis of the tire 1 in a normal state. The tire 1 of the present disclosure may be suitably used as a pneumatic tire for passenger vehicles. However, the tire 1 is not limited to such an embodiment and may be used as a heavy duty tire, for example.

Unless otherwise stated, the dimensions and angles of the components of the tire in the present disclosure are measured when the tire is mounted on a normal rim and inflated with air to a normal internal pressure. In the measurement, no load is applied to the tire. Herein, the term "normal rim" refers to a rim specified for each tire by the standard in a standard system including standards according to which tires are provided, and may be, for example, the standard rim in JATMA, "design rim" in TRA, or "measuring rim" in ETRTO. Herein, the term "normal internal pressure" refers to an air pressure specified for each tire by the standard and may be the maximum air pressure in JATMA, the maximum value shown in Table "TIRE LOAD LIMITS AT VARIOUS COLD INFLATION PRESSURES" in TRA, or "inflation pressure" in ETRTO.

As shown in FIG. 1, the tread portion 2 has at least one main groove 3 continuously extending in the tire circumferential direction. In the present embodiment of the disclosure, the tire has a total of four main grooves 3 which are provided adjacent to each other in the tire axial direction between the tire equator C and each tread edge Te, but the present disclosure is not limited to such an embodiment.

The tread edge Te refers to the axially outermost contact position of the tire 1 determined when the tire 1 in the normal state applied with a normal load is allowed to contact a plane at a camber angle of 0 degrees.

The term "normal load" refers to a load specified for each tire by the standard, and may the maximum load capacity in JATMA, the maximum value shown in Table "TIRE LOAD LIMITS AT VARIOUS COLD INFLATION PRESSURES" in TRA, or "load capacity" in ETRTO.

Each main groove 3 preferably has a groove width W1 that is, for example, 3.0 to 6.0% of the tread width TW. Herein, unless otherwise stated, the groove width of the main groove refers to the length between the groove edges appearing on the tread surface of the tread portion 2. The tread width TW refers to the distance from one tread edge Te to the other tread edge Te in the axial direction of the tire in the normal state. When the tire is a pneumatic tire for passenger vehicles, the groove depth of each main groove 3 is preferably, for example, 5 to 10 mm.

In the tire, at least one main groove 3 has a groove wall provided with a recessed portion that is recessed outwardly in the groove width direction from the groove edge 6 appearing on the tread surface of the tread portion 2. The tread pattern of the tire is not limited as long as it has a groove shape in which the sea proportion change ($S_{50}/S_0$) before and after wear of the tread portion 2 is within the range indicated earlier.

Figure 2:
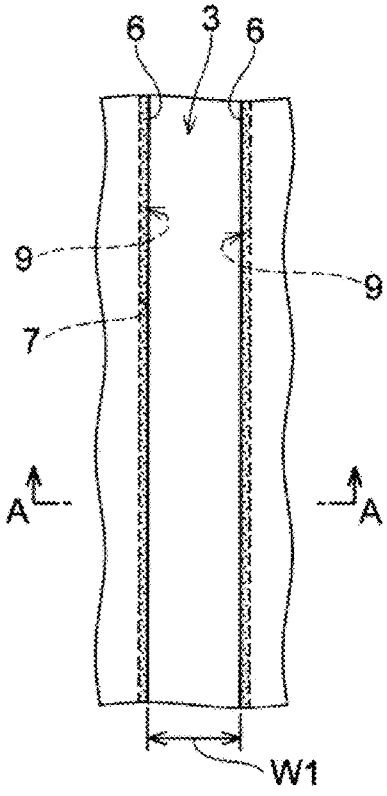
FIG. 2 shows an enlarged plan view of a main groove according to one embodiment of the present disclosure.

FIG. 2 shows an enlarged plan view of a main groove 3 according to the present disclosure. In FIG. 2, the groove edges 6 of the main groove 3 are indicated by solid lines, and the contours 7 of the groove walls as viewed in a plan view of the tread portion 2 are indicated by dashed lines. Moreover, the colored parts indicate the recessed regions between each groove edge 6 of the main groove 3 and the contour 7 of each groove wall.

Figure 3:
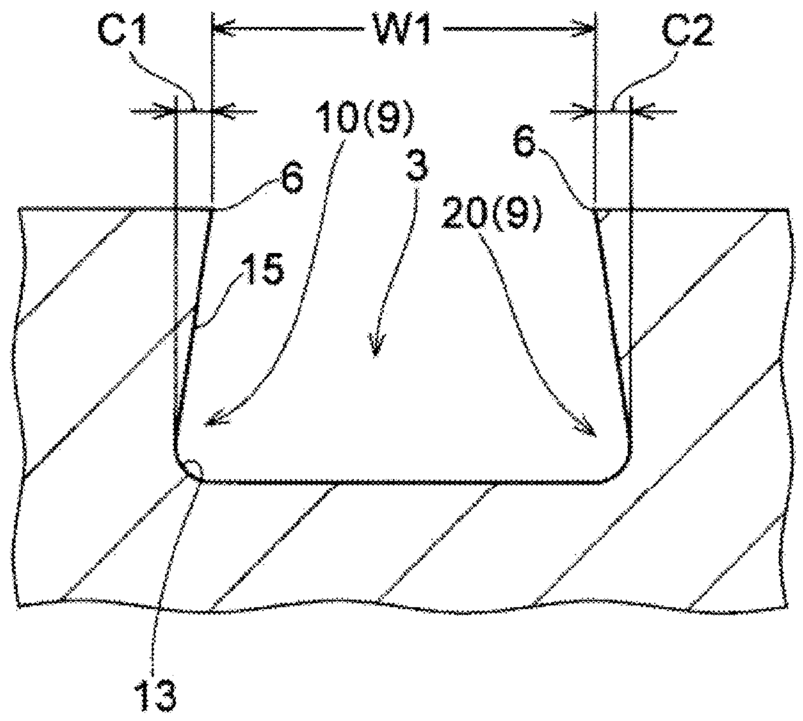
FIG. 3 shows an A-A cross-sectional view of FIG. 2.

FIG. 3 shows an A-A cross-sectional view of the main groove 3 shown in FIG. 2. As shown in FIG. 3, the main groove 3 has in either groove wall a recessed portion 9 in which the amount of recess is constant in the tire circumferential direction. For example, the recessed portion 9 includes a flat surface 15 between the deepest part 13 and the groove edge 6, but it is not limited to such an embodiment.

To ensure the groove volume of the main groove 3, the amounts of recess c1 and c2 from the groove edges 6 at the deepest parts 13 are each independently preferably 0.05 to 0.45 times, more preferably 0.07 to 0.40 times, still more preferably 0.10 to 0.35 times the groove width W1, which is the length between the groove edges of the main groove 3.

Figure 4:
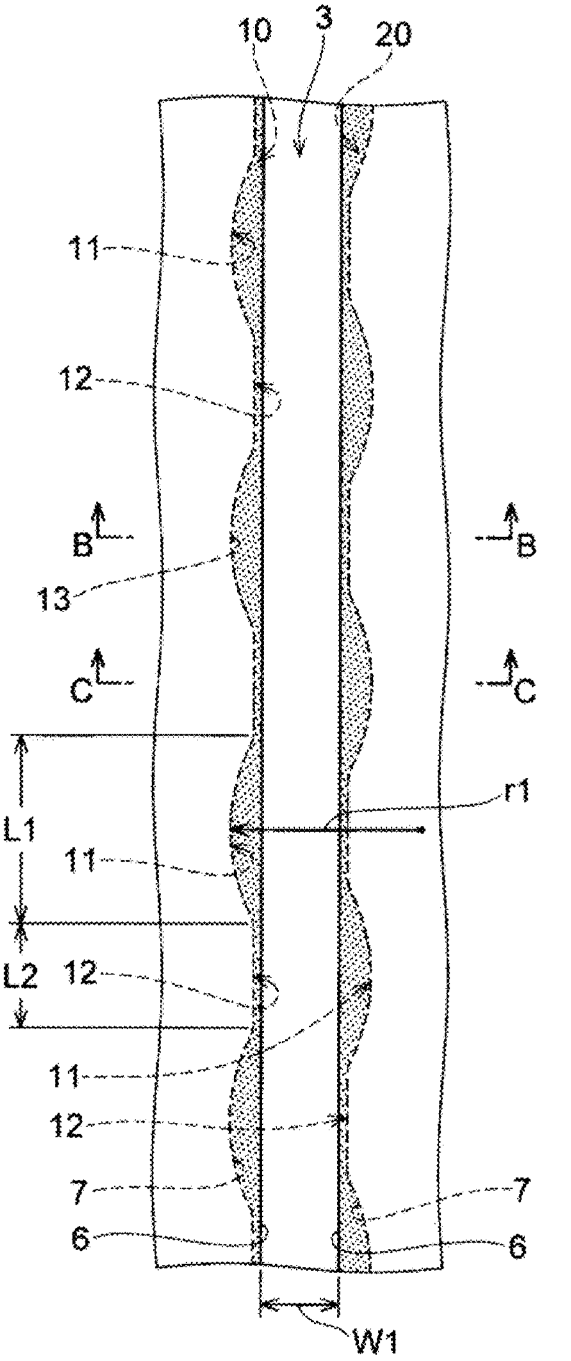
FIG. 4 shows an enlarged plan view of another main groove according to the present disclosure.

FIG. 4 shows an enlarged plan view of another main groove 3 according to the present disclosure. As shown in FIG. 4, a first groove wall 10, which is one of the groove walls of the main groove 3, is provided with at least one first recessed portion 11. The first groove wall 10 according to the present embodiment of the disclosure is provided with a plurality of first recessed portions 11.

In FIG. 4, the groove edges 6 of the main groove 3 are indicated by solid lines, and the contours 7 of the groove walls as viewed in a plan view of the tread portion 2 are indicated by dashed lines. Moreover, the colored parts indicate the recessed regions between each groove edge 6 of the main groove 3 and the contour 7 of each groove wall. Each first recessed portion 11 is recessed outwardly in the groove width direction from the groove edge 6 appearing on the tread surface of the tread portion 2. In the first recessed portions 11, the aperture area of the main groove 3 increases as the tread portion 2 is worn. Thus, much better handling stability can be exhibited for a long time.

Each first recessed portion 11 gradually reduces the amount of recess from the groove edge 6, from the deepest part 13 that is recessed most outwardly in the groove width direction toward either side of the tire circumferential direction. This can ensure the rigidity of the land portions defined by the main groove 3 on both sides of the deepest part 13 with respect to the tire circumferential direction, so that the groove edge side portions 8 (shown in FIG. 1) of the land portions can be inhibited from deforming toward the groove center of the main groove 3. Moreover, the first recessed portions 11 can smoothly change the rigidity of the land portions in the tire circumferential direction to suppress local deformation of the groove edge side portions 8. Thus, much better handling stability can be obtained.

In general, the main grooves continuously extending in the tire circumferential direction drain water backward against the traveling direction of the tire during wet driving, but when there is a lot of water on the road, the grooves tend to push some water away forward in the traveling direction of the tire. Owing to the first recessed portions 11 described above, the main grooves 3 according to the present disclosure can push some water away forward in the traveling direction of the tire as well as outwardly in the tire axial direction, and further can suppress the entry of the pushed-away water between the tread portion 2 and the road. Moreover, since the groove area increases as wear proceeds, the reduction in groove volume associated with the progress of wear can be delayed as compared with conventional grooves.

In each first recessed portion 11, the arc-like contour portion 7 as viewed in a cross-section taken along the tread surface of the tread portion 2 preferably has a curvature which gradually increases inwardly in the tire radial direction. Such first recessed portions 11 can ensure a large groove volume of the main groove 3 while suppressing deformation of the groove edge side portions 8.

In the present disclosure, the radius of curvature r1 of the contour portion 7 is preferably 1.5 to 3.0 times the groove width W1. Moreover, the length L1 in the tire circumferential direction of the first recessed portion 11 is preferably 2.0 to 3.0 times the groove width W1 of the main groove 3.

Figure 5A:
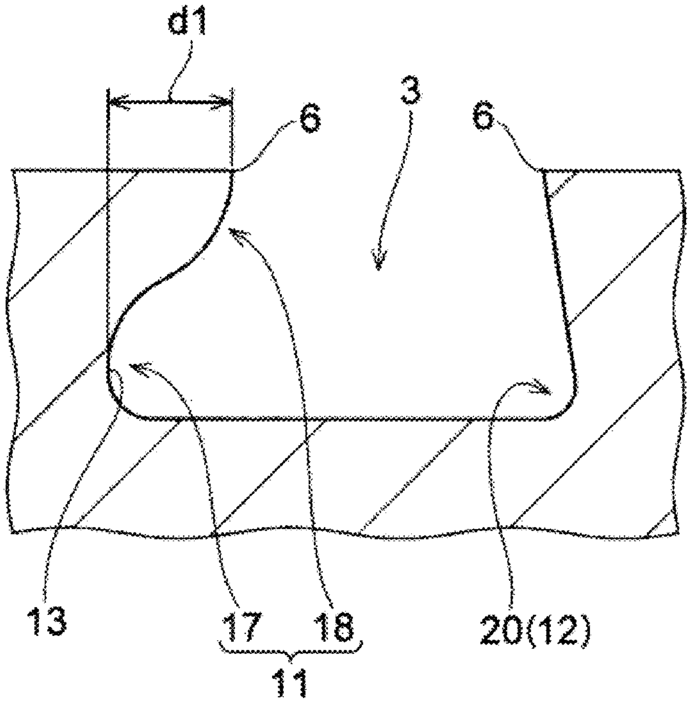
FIG. 5A shows a B-B cross-sectional view of FIG. 4.

FIG. 5A shows a B-B cross-sectional view of FIG. 4 corresponding to a groove cross-section passing through the deepest part 13 of the first recessed portion 11 provided in the first groove wall 10. The first recessed portion 11 is preferably provided on the groove bottom side of the groove wall of the main groove 3 as shown in FIG. 5A.

For example, the first recessed portion 11 according to the present embodiment of the disclosure includes a concave portion 17 that is recessed outwardly in the groove width direction, and a convex portion 18 that is connected outwardly in the tire radial direction with the concave portion 17 and is convex toward the groove center line of the main groove 3. The concave portion 17 and the convex portion 18 are each preferably curved in a smooth arc shape. However, the first recessed portion 11 is not limited to such an embodiment and may include a flat surface between the deepest part 13 and the groove edge 6.

When viewed in a groove cross-section passing through the deepest part 13, the first recessed portion 11 preferably gradually reduces the recess amount from the deepest part 13 toward the outside in the tire radial direction. To ensure the groove volume of the main groove 3, the amount of recess d1 from the groove edge 6 at the deepest part 13 is preferably not less than 0.10 times, more preferably not less than 0.20 times, still more preferably not less than 0.30 times the groove width W1, which is the length between the groove edges of the main groove 3. Moreover, the amount of recess d1 is not limited, but is preferably not more than 0.50 times the groove width W1 to provide easy removal of the main groove-forming rib of a vulcanization mold from the tread portion.

The first groove wall 10 is preferably further provided with at least one second recessed portion 12 as shown in FIG. 4. In a preferred embodiment, the first groove wall 10 is provided with a plurality of second recessed portions 12.

In the first groove wall 10 according to the present disclosure as a more preferred embodiment, the first recessed portion 11 and the second recessed portion 12 are provided alternately in the tire circumferential direction. The second recessed portion 12 is recessed outwardly in the groove width direction from the groove edge 6, and the amount of recess from the groove edge 6 thereof is constant in the tire circumferential direction.

Preferably, for example, the second recessed portion 12 has a smaller length in the tire circumferential direction than the first recessed portion 11. The length L2 in the tire circumferential direction of the second recessed portion 12 is preferably, for example, 0.45 to 0.60 times the length L1 in the tire circumferential direction of the first recessed portion 11. Such a second recessed portion 12 can further enhance handling stability.

Figure 5B:
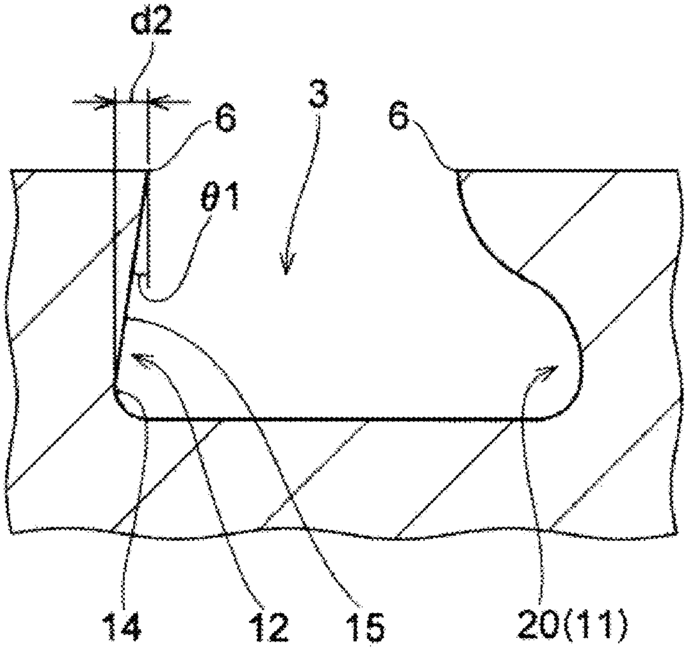
FIG. 5B shows a C-C cross-sectional view of FIG. 4.

FIG. 5B shows a C-C cross-sectional view of FIG. 4 corresponding to a groove cross-section passing through the second recessed portion 12 provided in the first groove wall 10. For example, the second recessed portion 12 include a flat surface 15 between the deepest part 14 and the groove edge 6 as shown in FIG. 5B, but it is not limited to such an embodiment.

The flat surface 15 of the second recessed portion 12 preferably has an angle θ1 of, for example, 5 to 15°. Here, the angle θ1 refers to the angle between a tread normal line passing through the groove edge 6 and the flat surface 15.

From the same standpoint, the maximum recess amount d2 of the second recessed portion 12 is preferably smaller than the amount of recess d1 at the deepest part 13 of the first recessed portion 11. Moreover, the recess amount d2 of the second recessed portion 12 is preferably 0.01 to 0.25 times, more preferably 0.03 to 0.20 times, still more preferably 0.05 to 0.15 times the groove width W1 of the main groove 3.

As shown in FIG. 4, a second groove wall 20, which is the other groove wall of the main groove 3, is provided with at least one first recessed portion 11 as described above. The second groove wall 20 is further provided with at least one second recessed portion 12 as described above. Here, FIG. 5A shows a groove cross-sectional view of the second recessed portion 12 provided in the second groove wall 20, and FIG. 5B shows a groove cross-sectional view of the first recessed portion 11 provided in the second groove wall 20.

In a preferred embodiment, the second groove wall 20 is provided with a plurality of first recessed portions 11 and a plurality of second recessed portions 12 as shown in FIG. 4. In the second groove wall 20 according to the present disclosure as a more preferred embodiment, the first recessed portion 11 and the second recessed portion 12 are provided alternately in the tire circumferential direction. This can further improve handling stability after wear of the tread portion.

In the present disclosure, for example, the first recessed portions 11 provided in the second groove wall 20 face the second recessed portions 12 provided in the first groove wall 10. For example, the second recessed portions 12 provided in the second groove wall 20 face the first recessed portions 11 provided in the first groove wall 10. Thus, for example, the first recessed portions 11 provided in the first groove wall 10 and the first recessed portions 11 provided in the second groove wall 20 are provided alternately in the tire circumferential direction. Such an arrangement of the recessed portions can reduce an increase in the air column resonance sound of the main groove.

Figure 6:
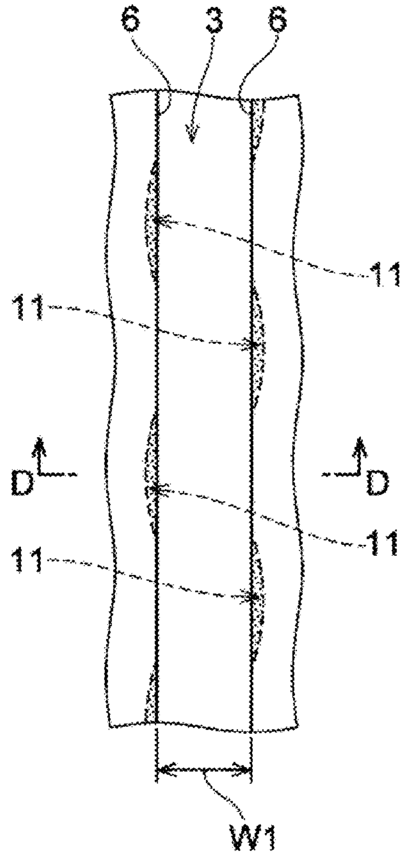
FIG. 6 shows an enlarged plan view of another main groove according to the present disclosure.
Figure 7:
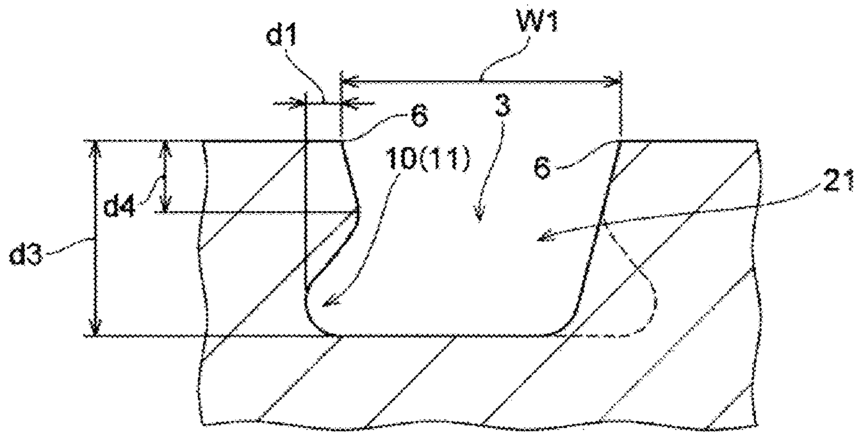
FIG. 7 shows a D-D cross-sectional view of FIG. 6.

FIG. 6 shows an enlarged plan view of another main groove 3 according to the present disclosure. FIG. 7 shows a D-D cross-sectional view of the main groove 3 shown in FIG. 6. As shown in FIGS. 6 and 7, the main groove 3 has a groove width-gradually decreasing portion 21 which gradually reduces the groove width from the groove edge 6 toward the inside in the tire radial direction. Moreover, a first recessed portion 11 is located inwardly in the tire radial direction from the groove width-gradually decreasing portion 21. Such a main groove 3 can further suppress deformation of the groove edge side portions 8 of the land portions of the new tire, thereby resulting in excellent handling stability.

For example, the groove width-gradually decreasing portion 21 extends in the tire circumferential direction while having a constant cross-sectional shape. The depth d4 of the groove width-gradually decreasing portion 21 is preferably, for example, 0.30 to 0.50 times the depth d3 of the main groove 3.

For example, a plurality of first recessed portions 11, each located inwardly in the tire radial direction from the groove width-gradually decreasing portion 21, are provided in the tire circumferential direction. In this embodiment, the first recessed portions 11 provided in the first groove wall 10 and the first recessed portions 11 provided in the second groove wall 20, each located inwardly in the tire radial direction from the groove width-gradually decreasing portion 21, are provided alternately in the tire circumferential direction. Such a main groove 3 can suppress local deformation of the land portions, thereby ensuring much better handling stability.

To ensure the groove volume of the main groove 3, the total recess amount of the main groove 3 is preferably 0.10 to 0.90 times, more preferably 0.15 to 0.80 times, still more preferably 0.20 to 0.70 times the groove width W1 of the main groove 3. Herein, the term "total recess amount of the main groove" refers to "C1+C2", "d1+d2", and "d1" when the main groove 3 is the embodiment of FIG. 3, the embodiment of FIG. 5, and the embodiment of FIG. 7, respectively.

EXAMPLES

The present disclosure is specifically described with reference to, but not limited to, examples.

Here, the chemicals used in the synthesis or polymerization were purified according to usual methods, if necessary.

Moreover, the methods for evaluation of the prepared polymers are collectively described below.

(Measurement of Weight Average Molecular Weight (Mw))

The weight average molecular weight (Mw) of the polymers was determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

(Structural Identification of Polymer)

The structural identification of the polymers was determined using a NMR instrument of JNM-ECA series available from JEOL Ltd. Here, the cis content was measured by infrared absorption spectrometry.

Production Example of Polymer (Polymerization of Polymer A)

A sufficiently nitrogen-purged heat-resistant vessel was charged with 1500 mL of n-hexane, 25 g of styrene, 75 g of 1,3-butadiene, 0.2 mmol of tetramethylethylenediamine, and 0.24 mmol of n-butyllithium, followed by stirring at 0° C. for 48 hours. Subsequently, the reaction was terminated by adding alcohol, and 24 mL of a 1 mmol/L solution of BHT in ethanol was added to the reaction solution. A 10 mL fraction of the polymerization solution was collected, precipitated with 40 mL of ethanol, and then dried to obtain a polymer A. The polymer (SBR) had a weight average molecular weight of 460,000 and a styrene content of 25% by mass, and the yield was 99%.

(Polymerization of Polymer B)

Preparation of Catalyst Solution B

A dried and nitrogen-purged 1 L pressure-resistant stainless steel vessel was charged with 350 mL of cyclohexane and 35 g of butadiene monomer. To the vessel were added 54 mL of a 20 vol % solution of neodymium versatate in cyclohexane and then 130 mL of a solution of PMAO in toluene, followed by stirring for 30 minutes. Then, 30 mL of a 1 M solution of DAIBAH in hexane was added and then stirred for 30 minutes. Subsequently, 15 mL of a 1 M solution of 2-chloro-2-methylpropane in cyclohexane was added and then stirred for 30 minutes to give a catalyst solution A.

Polymerization of Polymer B

A dried and nitrogen-purged 3 L pressure-resistant stainless steel vessel was charged with 2000 mL of cyclohexane and 100 g of butadiene, and then 10 mL of a 1 mol/L solution of TIBA in normal hexane was added and stirred for 5 minutes. After confirming that the solution was transparent, 30 mL of the catalyst solution A was added to perform a polymerization reaction at 80° C. for 3 hours. After 3 hours, 50 mL of a 1 M solution of isopropanol in THF as a reaction terminating agent was added dropwise to terminate the reaction. A 10 mL fraction of the polymerization solution was collected, precipitated with 40 mL of ethanol, and then dried to obtain a polymer B. The polymer (BR) had a weight average molecular weight of 800,000 and a cis content of 98% by mass, and the yield was 99%.

(Production of Hydrogenated SBR)

A sufficiently nitrogen-purged heat-resistant reaction vessel was charged with n-hexane, styrene, 1,3-butadiene, N,N,N',N'-tetramethylethylenediamine (TMEDA), and n-butyllithium, followed by stirring at 50° C. for 5 hours to perform a polymerization reaction. Thereafter, the reaction was stirred for 20 minutes while supplying hydrogen gas at a pressure of 0.4 MPa gauge to react unreacted polymer terminal lithium with hydrogen into lithium hydride. Hydrogenation was performed using a titanocene dichloride-based catalyst at a hydrogen gas supply pressure of 0.7 MPa gauge and a reaction temperature of 90° C. Once the cumulative amount of absorbed hydrogen reached the amount corresponding to the target degree of hydrogenation, the reaction temperature was brought to room temperature, and the hydrogen pressure was returned to an ordinary pressure. Then, the reaction solution was drawn from the reaction vessel and introduced into water with stirring, and the solvent was removed by steam stripping to obtain a hydrogenated SBR.

(Production Example A-1) Production of Polymer Composite A-1

To the polymerization solution of the polymer A (equivalent to 100 g of the solids, solvent: n-hexane) were added 100 g of isopropylacrylamide (NIPAM) and 16.7 mmol of azobisisobutyronitrile (AIBN), followed by stirring at 70° C. to 110° C. for 5 hours. The solvent was distilled off, and the resulting product was dried under reduced pressure at 80° C. and 1 mmHg to a loss on drying of 0.5% or less and then pressed into a 2 mm-thick sheet. The reaction rate was 99% as determined from the protons before the reaction (NIPAM) and after the reaction (PNIPAM) by $^1$H-NMR.

(Production Example A-2) Production of Polymer Composite A-2

The same procedure as in Production Example A-1 was followed, except that NIPAM was replaced with ethyl vinyl ether (EVE). The reaction rate was 99% as determined from the protons before the reaction (EVE) and after the reaction (PEVE) by 1H-NMR.

(Production Example B-1) Production of Polymer Composite B-1

The same procedure as in Production Example A-1 was followed, except that the polymer was replaced with the polymer B, and the solvent was changed to cyclohexane. The reaction rate was 99% as determined from the protons before the reaction (NIPAM) and after the reaction (PNIPAM) by $^1$H-NMR.

(Production Example B-2) Production of Polymer Composite B-2

The same procedure as in Production Example B-1 was followed, except that NIPAM was replaced with ethyl vinyl ether (EVE). The reaction rate was 99% as determined from the protons before the reaction (EVE) and after the reaction (PEVE) by 1H-NMR.

The production conditions and other information of the polymer composites are collectively shown in Table 2.

Polymer composite A-2: the above-described polymer composite A-2

Polymer composite B-1: the above-described polymer composite B-1

Polymer composite B-2: the above-described polymer composite B-2

Resin: Sylvares SA85 (copolymer of α-methylstyrene and styrene, softening point: 85° C.) available from Arizona Chemical Oil: Diana process AH available from Idemitsu Kosan Co., Ltd.

Liquid farnesene polymer: L-FBR-742 (liquid farnesene-butadiene copolymer) available from Kuraray Co., Ltd.

Stearic acid: stearic acid available from NOF Corporation

Zinc oxide: zinc oxide #1 available from Mitsui Mining & Smelting Co., Ltd.

Wax: Ozoace 0355 available from Nippon Seiro Co., Ltd.

Antioxidant 1: NOCRAC 6C (N-(1,3-dimethylbutyl)-N'-phenyl-p-phenylenediamine) available from Ouchi Shinko Chemical Industrial Co., Ltd.

Antioxidant 2: NOCRAC 224 (poly(2,2,4-trimethyl-1,2-dihydroqunoline) available from Ouchi Shinko Chemical Industrial Co., Ltd.

Sulfur: powdered sulfur available from Tsurumi Chemical Industry Co., Ltd.

Vulcanization accelerator 1: NOCCELER CZ (N-cyclohexyl-2-benzothiazolylsulfenamide) available from Ouchi Shinko Chemical Industrial Co., Ltd.

Vulcanization accelerator 2: NOCCELER D (1,3-diphenylguanidine) available from Ouchi Shinko Chemical Industrial Co., Ltd.

TABLE 2

| | | Production Example | | | |
|---|---|---|---|---|---|
| | | A-1 | A-2 | B-1 | B-2 |
| | Polymer composite | A-1 | A-2 | B-1 | B-2 |
| Conjugated diene | Type | Polymer A | Polymer A | Polymer B | Polymer B |
| | Molecular weight | 460,000 | 460,000 | 800,000 | 800,000 |
| | Amount | 100 | 100 | 100 | 100 |
| Reactant | Type | NIPAM | EVE | NIPAM | EVE |
| | Molecular weight design value | 3000 | 3000 | 3000 | 3000 |
| | Amount | 100 | 100 | 100 | 100 |
| Mixing method | Radical | Yes | Yes | Yes | Yes |
| Sheet condition | | Uniform | Uniform | Uniform | Uniform |

The chemicals used in the examples and comparative examples below are listed below.

SBR: the above-described polymer A

BR: the above-described polymer B

Hydrogenated SBR: the above-described hydrogenated SBR (conjugated diene unit: 3.3 mol %, non-conjugated olefin unit: 88.2 mol %, aromatic vinyl unit: 8.5 mol % (styrene content: 25% by mass), Mw: 450,000)

Carbon black: N134 ($N_2SA$: 148 $m^2/g$, DBP: 123 ml/100 g) available from Cabot Japan K.K.

Silica 1: ULTRASIL VN3 ($N_2SA$: 175 $m^2/g$, CTAB specific surface area: 166 $m^2/g$) available from Evonik Degussa Silica 2: ZEOSIL 115GR (N2SA: 112 $m^2/g$, CTAB specific surface area: 116 $m^2/g$) available from Rhodia Silane coupling agent: Si69 (bis(3-triethoxysilylpropyl) tetrasulfide) available from Evonik Degussa Polymer composite A-1: the above-described polymer composite A-1

EXAMPLES AND COMPARATIVE EXAMPLES

According to the formulation recipe shown in Table 3 to 6, the chemicals other than the sulfur and vulcanization accelerators were kneaded using a 1.7 L Banbury mixer (Kobe Steel, Ltd.) at 150° C. for 5 minutes to obtain a kneaded mixture. Then, the kneaded mixture was kneaded with the sulfur and vulcanization accelerators in an open roll mill at 80° C. for 5 minutes to obtain an unvulcanized rubber composition. The unvulcanized rubber composition was formed into the shape of a tread and assembled with other tire components to prepare an unvulcanized tire. The unvulcanized tire was vulcanized at 170° C. to obtain a test tire (size: 205/65R15, rim: 15×6.0 J, internal pressure: 230 kPa).

It should be noted that in Tables 3 to 6, the conjugated diene polymer (rubber component) contained in each polymer composite is taken into account to adjust the rubber component content to 100 parts by mass.

It should be noted that each tire had a tread provided with at least one main groove continuously extending in the tire circumferential direction, and the groove structure of each tire was designed to have the $S_0$ and $S_{50}$ indicated in Table 3 to 6.

A contact patch of each test tire was determined by mounting the tire on a normal rim, applying an ink to the tread portion, and perpendicularly pressing the tread portion against a paper at a load of 70% of a maximum load capacity to transfer the ink applied to the tread portion. The sea proportion $S_0$ is calculated by regarding the area defined by the outline of the contact patch as the entire tread ground contact area that would be obtained if all grooves were not provided, and determining the total groove area of grooves which can remain after 50% wear of the main groove without changing the tread radius, in the parts without the ink. Moreover, the sea proportion $S_{50}$ is calculated similarly as above by determining the entire tread ground contact area that would be obtained if all grooves in the tread portion were not provided and the total groove area of grooves which have remained after 50% wear of the main groove without changing the tread radius, determined after the 50% wear.

(Rubber Hardness (Hs))

The hardness of a rubber specimen cut out from the tread of each test tire was measured. Specifically, the hardness (JIS-A hardness) of the specimen was measured in accordance with JIS K 6253-3 (2012) "Rubber, vulcanized or thermoplastic—Determination of hardness—Part 3: Durometer method" using a type A durometer. The measurement was carried out at 0° C. or 60° C.

The tread portion of each new test tire was worn along the tread radius until the depth of the deepest groove in the tire reached 50% of that of the new tire. Then, the tire was thermally degraded at 80° C. for 7 days to prepare a worn test tire. Each worn test tire was subjected to the following evaluations. Tables 3 to 6 show the results.

(Handling Stability on Wet Roads when Worn)

The worn test tires were mounted on each wheel of a car (front-engine, front-wheel drive car of 2000 cc displacement made in Japan). A driver drove the car on a wet asphalt road in a test course and subjectively evaluated the handling stability. Then, the results were expressed as an index relative to those of Comparative Example 1 taken as 100. A higher index indicates better handling stability on wet roads when worn.

(Handling Stability on Icy Roads when Worn)

The worn test tires were mounted on each wheel of a car (front-engine, front-wheel drive car of 2000 cc displacement made in Japan). A driver drove the car on an icy road in a test course and subjectively evaluated the handling stability. Then, the results were expressed as an index relative to those of Comparative Example 1 taken as 100. A higher index indicates better handling stability on icy roads when worn.

The sum of the two indices of handling stability on wet roads when worn and handling stability on icy roads when worn was defined as the overall performance in terms of handling stability on wet roads when worn and handling stability on icy roads when worn. Here, the overall performance was considered as poor when the sum was large but one of the indices was lower than 100.

TABLE 3

| | | Comparative Example 1 | Comparative Example 2 | Comparative Example 3 | Comparative Example 4 | Comparative Example 5 | Comparative Example 6 |
|---|---|---|---|---|---|---|---|
| Amount (parts by mass) | SBR | 70 | 70 | 70 | 70 | 60 | 60 |
| | Hydrogenated SBR | | | | | | |
| | BR | 30 | 30 | 30 | 30 | 30 | 30 |
| | Carbon black | 5 | 5 | 5 | 5 | 5 | 5 |
| | Silica 1 | 80 | 80 | | 80 | 80 | 80 |
| | Silica 2 | | | 80 | | | |
| | Silane coupling agent | 6 | 6 | 6 | 6 | 6 | 6 |
| | Polymer composite A-1 | | | | | | |
| | Polymer composite A-2 | | | | | 20 | 20 |
| | Polymer composite B-1 | | | | | | |
| | Polymer composite B-2 | | | | | | |
| | Resin | 10 | 10 | 10 | 10 | 10 | 10 |
| | Oil | 25 | 25 | 25 | 25 | 35 | 25 |
| | Liquid farnesene polymer | | | | | | |
| | Stearic acid | 1.5 | 1.5 | 1.5 | 1.5 | 1.5 | 1.5 |
| | Zinc oxide | 1.5 | 1.5 | 1.5 | 1.5 | 1.5 | 1.5 |
| | Wax | 2 | 2 | 2 | 2 | 2 | 2 |
| | Antioxidant 1 | 2 | 2 | 2 | 2 | 2 | 2 |
| | Antioxidant 2 | 1 | 1 | 1 | 1 | 1 | 1 |
| | Sulfur | 1.2 | 1.3 | 1.3 | 1.2 | 1.2 | 1.2 |
| | Vulcanization accelerator 1 | 1.5 | 1.5 | 1.5 | 1.5 | 1.5 | 1.5 |
| | Vulcanization accelerator 2 | 2 | 2 | 2 | 2 | 2 | 2 |
| Physical properties, etc. | Hs at 60° C. | 56 | 57 | 56 | 56 | 56 | 59 |
| | Hs at 0° C. | 68 | 70 | 66 | 68 | 60 | 63 |
| | Hs at 0° C. relative to Hs at 60° C. (%) | 121 | 123 | 118 | 121 | 107 | 107 |
| | $S_{50}$ | 39 | 39 | 39 | 26 | 39 | 26 |
| | $S_0$ | 37.3 | 37.3 | 37.3 | 37.3 | 37.3 | 37.3 |
| | $S_{50}/S_0$ | 1.05 | 1.05 | 1.05 | 0.70 | 1.05 | 0.70 |
| Evaluation result | Handling stability on wet roads when worn | 100 | 102 | 100 | 90 | 99 | 96 |
| | Handling stability on icy roads when worn | 100 | 96 | 104 | 86 | 116 | 97 |

TABLE 3-continued

| | | Example 1 | Example 2 | Example 3 | Example 4 | Example 5 | Example 6 |
|---|---|---|---|---|---|---|---|
| Amount (parts by mass) | SBR | 60 | 60 | 60 | 60 | 60 | 60 |
| | Hydrogenated SBR | | | | | | |
| | BR | 30 | 30 | 30 | 30 | 30 | 30 |
| | Carbon black | 5 | 5 | 5 | 5 | 5 | 5 |
| | Silica 1 | 80 | 80 | 80 | 80 | 80 | 80 |
| | Silica 2 | | | | | | |
| | Silane coupling agent | 6 | 6 | 6 | 6 | 6 | 6 |
| | Polymer composite A-1 | | | | | | |
| | Polymer composite A-2 | 20 | 20 | 20 | 20 | 20 | 20 |
| | Polymer composite B-1 | | | | | | |
| | Polymer composite B-2 | | | | | | |
| | Resin | 10 | 10 | 10 | 10 | 10 | 10 |
| | Oil | 25 | 25 | 25 | 25 | 25 | 25 |
| | Liquid farnesene polymer | | | | | | |
| | Stearic acid | 1.5 | 1.5 | 1.5 | 1.5 | 1.5 | 1.5 |
| | Zinc oxide | 1.5 | 1.5 | 1.5 | 1.5 | 1.5 | 1.5 |
| | Wax | 2 | 2 | 2 | 2 | 2 | 2 |
| | Antioxidant 1 | 2 | 2 | 2 | 2 | 2 | 2 |
| | Antioxidant 2 | 1 | 1 | 1 | 1 | 1 | 1 |
| | Sulfur | 1.2 | 1.5 | 1.8 | 1.2 | 1.2 | 1.2 |
| | Vulcanization accelerator 1 | 1.5 | 1.5 | 1.5 | 1.5 | 1.5 | 1.5 |
| | Vulcanization accelerator 2 | 2 | 2 | 2 | 2 | 2 | 2 |
| Physical properties, etc. | Hs at 60° C. | 59 | 62 | 65 | 59 | 59 | 59 |
| | Hs at 0° C. | 63 | 66 | 68 | 63 | 63 | 63 |
| | Hs at 0° C. relative to Hs at 60° C. (%) | 107 | 106 | 105 | 107 | 107 | 107 |
| | $S_{50}$ | 39 | 39 | 39 | 41 | 43 | 45 |
| | $S_0$ | 37.3 | 37.3 | 37.3 | 37.3 | 37.3 | 37.3 |
| | $S_{50}/S_0$ | 1.05 | 1.05 | 1.05 | 1.10 | 1.15 | 1.21 |
| Evaluation result | Handling stability on wet roads when worn | 106 | 112 | 118 | 108 | 109 | 111 |
| | Handling stability on icy roads when worn | 112 | 106 | 100 | 114 | 115 | 117 |

TABLE 4

| | | Example 1 | Example 7 | Example 8 |
|---|---|---|---|---|
| Amount (parts by mass) | SBR | 60 | | 60 |
| | Hydrogenated SBR | | 60 | |
| | BR | 30 | 30 | 30 |
| | Carbon black | 5 | 5 | 5 |
| | Silica 1 | 80 | 80 | 80 |
| | Silica 2 | | | |
| | Silane coupling agent | 6 | 6 | 6 |
| | Polymer composite A-1 | | | |
| | Polymer composite A-2 | 20 | 20 | 20 |
| | Polymer composite B-1 | | | |
| | Polymer composite B-2 | | | |
| | Resin | 10 | 10 | 10 |
| | Oil | 25 | 25 | |
| | Liquid farnesene polymer | | | 25 |
| | Stearic acid | 1.5 | 1.5 | 1.5 |
| | Zinc oxide | 1.5 | 1.5 | 1.5 |
| | Wax | 2 | 2 | 2 |
| | Antioxidant 1 | 2 | 2 | 2 |
| | Antioxidant 2 | 1 | 1 | 1 |
| | Sulfur | 1.2 | 1.2 | 1.2 |
| | Vulcanization accelerator 1 | 1.5 | 1.5 | 1.5 |
| | Vulcanization accelerator 2 | 2 | 2 | 2 |
| Physical properties, etc. | Hs at 60° C. | 59 | 61 | 60 |
| | Hs at 0° C. | 63 | 63 | 63 |
| | Hs at 0° C. relative to Hs at 60° C. (%) | 107 | 103 | 105 |
| | $S_{50}$ | 39 | 39 | 39 |
| | $S_0$ | 37.3 | 37.3 | 37.3 |
| | $S_{50}/S_0$ | 1.05 | 1.05 | 1.05 |
| Evaluation result | Handling stability on wet roads when worn | 106 | 112 | 110 |
| | Handling stability on icy roads when worn | 112 | 112 | 112 |

TABLE 5

| | | Example 1 | Example 9 |
|---|---|---|---|
| Amount (parts by mass) | SBR | 60 | 60 |
| | Hydrogenated SBR | | |
| | BR | 30 | 30 |
| | Carbon black | 5 | 5 |
| | Silica 1 | 80 | 80 |
| | Silica 2 | | |
| | Silane coupling agent | 6 | 6 |
| | Polymer composite A-1 | | 20 |
| | Polymer composite A-2 | 20 | |
| | Polymer composite B-1 | | |
| | Polymer composite B-2 | | |
| | Resin | 10 | 10 |
| | Oil | 25 | 25 |
| | Liquid farnesene polymer | | |
| | Stearic acid | 1.5 | 1.5 |
| | Zinc oxide | 1.5 | 1.5 |
| | Wax | 2 | 2 |
| | Antioxidant 1 | 2 | 2 |
| | Antioxidant 2 | 1 | 1 |
| | Sulfur | 1.2 | 1.2 |
| | Vulcanization accelerator 1 | 1.5 | 1.5 |
| | Vulcanization accelerator 2 | 2 | 2 |
| Physical properties, etc. | Hs at 60° C. | 59 | 59 |
| | Hs at 0° C. | 63 | 61 |
| | Hs at 0° C. relative to Hs at 60° C. (%) | 107 | 103 |
| | $S_{50}$ | 39 | 39 |
| | $S_0$ | 37.3 | 37.3 |
| | $S_{50}/S_0$ | 1.05 | 1.05 |
| Evaluation result | Handling stability on wet roads when worn | 106 | 105 |
| | Handling stability on icy roads when worn | 112 | 111 |

TABLE 6

| | | Comparative Example 1 | Example 10 | Example 11 |
|---|---|---|---|---|
| Amount (parts by mass) | SBR | 70 | 70 | 70 |
| | Hydrogenated SBR | | | |
| | BR | 30 | 20 | 20 |
| | Carbon black | 5 | 5 | 5 |
| | Silica 1 | 80 | 80 | 80 |
| | Silica 2 | | | |
| | Silane coupling agent | 6 | 6 | 6 |
| | Polymer composite A-1 | | | |
| | Polymer composite A-2 | | | |
| | Polymer composite B-1 | | 20 | |
| | Polymer composite B-2 | | | 20 |
| | Resin | 10 | 10 | 10 |
| | Oil | 25 | 25 | 25 |
| | Liquid farnesene polymer | | | |
| | Stearic acid | 1.5 | 1.5 | 1.5 |
| | Zinc oxide | 1.5 | 1.5 | 1.5 |
| | Wax | 2 | 2 | 2 |
| | Antioxidant 1 | 2 | 2 | 2 |
| | Antioxidant 2 | 1 | 1 | 1 |
| | Sulfur | 1.2 | 1.2 | 1.2 |
| | Vulcanization accelerator 1 | 1.5 | 1.5 | 1.5 |
| | Vulcanization accelerator 2 | 2 | 2 | 2 |
| Physical properties, etc. | Hs at 60° C. | 56 | 61 | 61 |
| | Hs at 0° C. | 68 | 64 | 62 |
| | Hs at 0° C. relative to Hs at 60° C. (%) | 121 | 105 | 102 |
| | $S_{50}$ | 39 | 39 | 39 |
| | $S_0$ | 37.3 | 37.3 | 37.3 |
| | $S_{50}/S_0$ | 1.05 | 1.05 | 1.05 |
| Evaluation result | Handling stability on wet roads when worn | 100 | 112 | 112 |
| | Handling stability on icy roads when worn | 100 | 108 | 112 |

As shown in Tables 3 to 6, the overall performance in terms of handing stability on wet roads when worn and handling stability on icy roads when worn was excellent in the tires of the examples including a tread portion which had at least one main groove continuously extending in the tire circumferential direction, included a rubber having a predetermined hardness or higher at 60° C. and a hardness at 0° C. of not more than a predetermined percentage of the hardness at 60° C., and had a $S_{50}/S_0$ ratio of more than 1, wherein $S_0$ denotes the sea proportion (%) in the tread ground contact surface of the new tire, and $S_{50}$ denotes the sea proportion (%) when the tread portion is worn until the depth of the main groove reaches 50% of that of the new tire.

Exemplary embodiments of the present disclosure include:

Embodiment 1. A tire, including a tread portion, the tread portion having at least one main groove continuously extending in a tire circumferential direction, the tread portion including a rubber having a hardness at 60° C. of 58 or higher and a hardness at 0° C. of not more than 115% of the hardness at 60° C., the tread portion having a $S_{50}/S_0$ ratio of more than 1, wherein $S_0$ denotes a sea proportion (%) in a tread ground contact surface of the new tire, and $S_{50}$ denotes a sea proportion (%) when the tread portion is worn until a depth of the main groove reaches 50% of that of the new tire.

Embodiment 2. The tire according to Embodiment 1, wherein the $S_{50}/S_0$ ratio is 1.05 to 1.40.

Embodiment 3. The tire according to Embodiment 1 or 2, wherein the rubber included in the tread portion has a hardness at 60° C. of 59 or higher.

Embodiment 4. The tire according to any one of Embodiments 1 to 3, wherein the rubber included in the tread portion has a hardness at 0° C. of not more than 110% of the hardness at 60° C.

Embodiment 5. The tire according to any one of Embodiments 1 to 4, wherein the rubber included in the tread portion contains, as a rubber component, a multi-component copolymer containing a conjugated diene unit, a non-conjugated olefin unit, and an aromatic vinyl unit.

Embodiment 6. The tire according to any one of Embodiments 1 to 5, wherein the rubber included in the tread portion contains at least one of a liquid polymer or a resin component.

Embodiment 7. The tire according to Embodiment 6, wherein the liquid polymer is a liquid farnesene polymer.

Embodiment 8. The tire according to Embodiment 6, wherein the resin component is a resin that is solid at 25° C. and is an aromatic vinyl polymer, a terpene resin, a petroleum resin, or a hydrogenated product thereof.

Embodiment 9. The tire according to any one of Embodiments 1 to 8, wherein the rubber included in the tread portion contains silica in an amount of 80 parts by mass or more per 100 parts by mass of a rubber component content in the rubber.

Embodiment 10. The tire according to any one of Embodiments 1 to 9, wherein the rubber included in the tread portion contains silica having a CTAB specific surface area of 200 $m^2/g$ or more.

Embodiment 11. The tire according to any one of Embodiments 1 to 10, wherein the rubber included in the tread portion contains a material that changes its hydrophilicity with changes in temperature.

Embodiment 12. The tire according to Embodiment 11, wherein the material that changes its hydrophilicity with changes in temperature is a polymer containing a group that changes its hydrophilicity with changes in temperature.

Embodiment 13. The tire according to Embodiment 12, wherein the group that changes its hydrophilicity with changes in temperature is a temperature-responsive polymer.

Embodiment 14. The tire according to Embodiment 12, wherein the group that changes its hydrophilicity with changes in temperature is a polymer that shows a lower critical solution temperature.

Embodiment 15. The tire according to Embodiment 12, wherein the group that changes its hydrophilicity with changes in temperature is at least one of a poly(N-substituted (meth)acrylamide) or a poly(alkyl vinyl ether).

REFERENCE SIGNS LIST

1 tire
2 tread portion
3 main groove
6 groove edge
7 contour of groove wall
8 groove edge side portion of land portion
9 recessed portion
10 first groove wall
11 first recessed portion
12 second recessed portion
13, 14 deepest part
15 flat surface
17 concave portion
18 convex portion
20 second groove wall
21 groove width-gradually decreasing portion

The invention claimed is:

1. A tire, comprising a tread portion, the tread portion having at least one main groove continuously extending in a tire circumferential direction, the tread portion comprising a rubber having a hardness at 60° C. of 58 or higher and a hardness at 0° C. of not more than 105% of the hardness at 60° C., the tread portion having a $S_{50}/S_0$ ratio of more than 1, wherein $S_0$ denotes a sea proportion (%) in a tread ground contact surface of the new tire, and $S_{50}$ denotes a sea proportion (%) when the tread portion is worn until a depth of the main groove reaches 50% of that of the new tire, wherein the rubber included in the tread portion comprises a polymer composite in which a group that changes its hydrophilicity with changes in temperature is bound to a conjugated diene polymer, and a solid resin of 5 parts by mass or more per 100 parts by mass of a rubber component content, and wherein the group that changes its hydrophilicity with changes in temperature shows a lower critical solution temperature (LCST) in water.

2. The tire according to claim 1, wherein the $S_{50}/S_0$ ratio is 1.05 to 1.40.

3. The tire according to claim 1, wherein the rubber comprised in the tread portion has a hardness at 60° C. of 59 or higher.

4. The tire according to claim 1, wherein the rubber comprised in the tread portion comprises, as a rubber component, a multi-component copolymer containing a conjugated diene unit, a non-conjugated olefin unit, and an aromatic vinyl unit.

5. The tire according to claim 4, wherein the rubber comprised in the tread portion comprises at least one of a liquid polymer or a resin component.

6. The tire according to claim 5, wherein the liquid polymer is a liquid farnesene polymer.

7. The tire according to claim 5, wherein the solid resin is an aromatic vinyl polymer, a terpene resin, a petroleum resin, or a hydrogenated product thereof.

8. The tire according to claim 7, wherein the rubber comprised in the tread portion comprises silica in an amount of 80 parts by mass or more per 100 parts by mass of a rubber component content in the rubber.

9. The tire according to claim 8, wherein the rubber comprised in the tread portion comprises silica having a CTAB specific surface area of 200 $m^2/g$ or more.

10. The tire according to claim 1, wherein the group that changes its hydrophilicity with changes in temperature is at least one of a poly(N-substituted (meth)acrylamide) or a poly(alkyl vinyl ether).

11. The tire according to claim 1, wherein the rubber comprised in the tread portion comprises, per 100 parts by mass of a rubber component content in the rubber, silica in an amount of 80 parts by mass or more and 200 parts by mass or less, and carbon black in an amount of 0.1 parts by mass or more and 20 parts by mass or less.

12. The tire according to claim 1, wherein the solid resin is an aromatic vinyl polymer.

13. The tire according to claim 1, wherein the rubber comprised in the tread portion comprises an oil in an amount of 25 parts by mass or more per 100 parts by mass of a rubber component content in the rubber.

14. A tire, comprising a tread portion,
the tread portion having at least one main groove continuously extending in a tire circumferential direction,
the tread portion comprising a rubber having a hardness at 60° C. of 58 or higher and a hardness at 0° C. of not more than 105% of the hardness at 60° C.,
the tread portion having a $S_{50}/S_0$ ratio of more than 1, wherein $S_0$ denotes a sea proportion (%) in a tread ground contact surface of the new tire, and $S_{50}$ denotes a sea proportion (%) when the tread portion is worn until a depth of the main groove reaches 50% of that of the new tire,
wherein the rubber included in the tread portion comprises a solid resin of 5 parts by mass or more per 100 parts by mass of a rubber component content,
wherein the rubber included in the tread portion comprises a polymer composite in which a group that changes its hydrophilicity with changes in temperature is bound to a conjugated diene polymer,
wherein the conjugated diene polymer has weight average molecular weight (Mw) as determined by gel permeation chromatography of 300,000 or more, and
wherein the group that changes its hydrophilicity with changes in temperature shows a lower critical solution temperature (LCST) in water.

15. The tire according to claim 14, wherein the rubber comprised in the tread portion comprises, per 100 parts by mass of a rubber component content in the rubber, silica in an amount of 80 parts by mass or more and 200 parts by mass or less, and carbon black in an amount of 0.1 parts by mass or more and 20 parts by mass or less.

16. The tire according to claim 14, wherein the solid resin is an aromatic vinyl polymer.

17. The tire according to claim 14, wherein the rubber comprised in the tread portion comprises an oil in an amount of 25 parts by mass or more per 100 parts by mass of a rubber component content in the rubber.

* * * * *